United States Patent
Rolf et al.

(10) Patent No.: US 11,692,839 B2
(45) Date of Patent: Jul. 4, 2023

(54) METHODS AND APPARATUSES FOR PROVIDING NAVIGATION INSTRUCTIONS

(71) Applicant: HERE Global B.V., Eindhoven (NL)

(72) Inventors: Daniel Rolf, Berlin (DE); Raul Cajias, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 163 days.

(21) Appl. No.: 17/115,508

(22) Filed: Dec. 8, 2020

(65) Prior Publication Data
US 2021/0364310 A1 Nov. 25, 2021

Related U.S. Application Data

(60) Provisional application No. 63/027,712, filed on May 20, 2020.

(51) Int. Cl.
*G01C 21/36* (2006.01)

(52) U.S. Cl.
CPC ..... *G01C 21/3617* (2013.01); *G01C 21/3629* (2013.01); *G01C 21/3635* (2013.01);
(Continued)

(58) Field of Classification Search
CPC ............ G01C 21/3617; G01C 21/3629; G01C 21/3635; G01C 21/3644; G01C 21/3608;
(Continued)

(56) References Cited

U.S. PATENT DOCUMENTS 6,697,731 B2   2/2004  Takayama et al.
6,892,133 B2   5/2005  Kornhauser et al.
(Continued)

OTHER PUBLICATIONS

AARP Online Learning Videos, Getting Directions with Google Maps Android, uploaded to YouTube May 18, 2016—Retrieved from internet: <https://www.youtube.com/watch?v=wsWwnq97ywQ>.*
(Continued)

*Primary Examiner* — Anne Marie Antonucci
*Assistant Examiner* — Jared C Bean
(74) *Attorney, Agent, or Firm* — Peter H. Yu; Here Global B.V.

(57) ABSTRACT

A method and an apparatus are disclosed for providing navigation instructions. The method may include receiving, from a user apparatus, a first location and a destination location; calculating a first route from the first location to the destination location; generating, for a predetermined time period, a first set of maneuvering data corresponding to the first route, the first set of maneuvering data comprising playback cues based on a predicted user apparatus location; transmitting the first set of maneuvering data to the user apparatus; receiving, from the user apparatus, a second location; generating, for a subsequent predetermined time period, a second set of maneuvering data, the second set of maneuvering data comprising playback cues based on a further predicted user apparatus location; calculating an update set of maneuvering data based on the first and second set of maneuvering data; and transmitting the update set of maneuvering data to the user apparatus.

19 Claims, 14 Drawing Sheets

(52) U.S. Cl.
CPC ..... *G01C 21/3644* (2013.01); *G01C 21/3608* (2013.01); *G01C 21/3611* (2013.01); *G01C 21/3632* (2013.01)

(58) Field of Classification Search
CPC ............ G01C 21/3611; G01C 21/3632; G01C 21/34; G01C 21/3676; G01C 21/3638; G01C 21/3667
See application file for complete search history.

(56) References Cited

U.S. PATENT DOCUMENTS

| | | | | |
|---|---|---|---|---|
| 8,060,641 | B2* | 11/2011 | Gupta | H04N 21/6581 |
| | | | | 725/116 |
| 8,751,146 | B2 | 6/2014 | Shrivathasan et al. | |
| 10,318,104 | B2* | 6/2019 | Pylappan | G06F 3/04817 |
| 2010/0191459 | A1* | 7/2010 | Carter | H04N 1/00244 |
| | | | | 348/222.1 |
| 2015/0310895 | A1 | 10/2015 | Shen et al. | |
| 2016/0025497 | A1 | 1/2016 | Baalu et al. | |
| 2017/0052035 | A1 | 2/2017 | Dorum et al. | |
| 2017/0219369 | A1* | 8/2017 | Lei | G08G 1/096758 |
| 2018/0188048 | A1 | 7/2018 | Ding et al. | |

OTHER PUBLICATIONS

Cai et al., "Digesting Omni-video Along Routes for Navigation", published in MM '10: Proceedings of the 18th ACM international conference on Multimedia, Oct. 2010, retrieved from https://dl.acm.org/doi/pdf/10.1145/1873951.1874042?download=true, pp. 647-650.

* cited by examiner

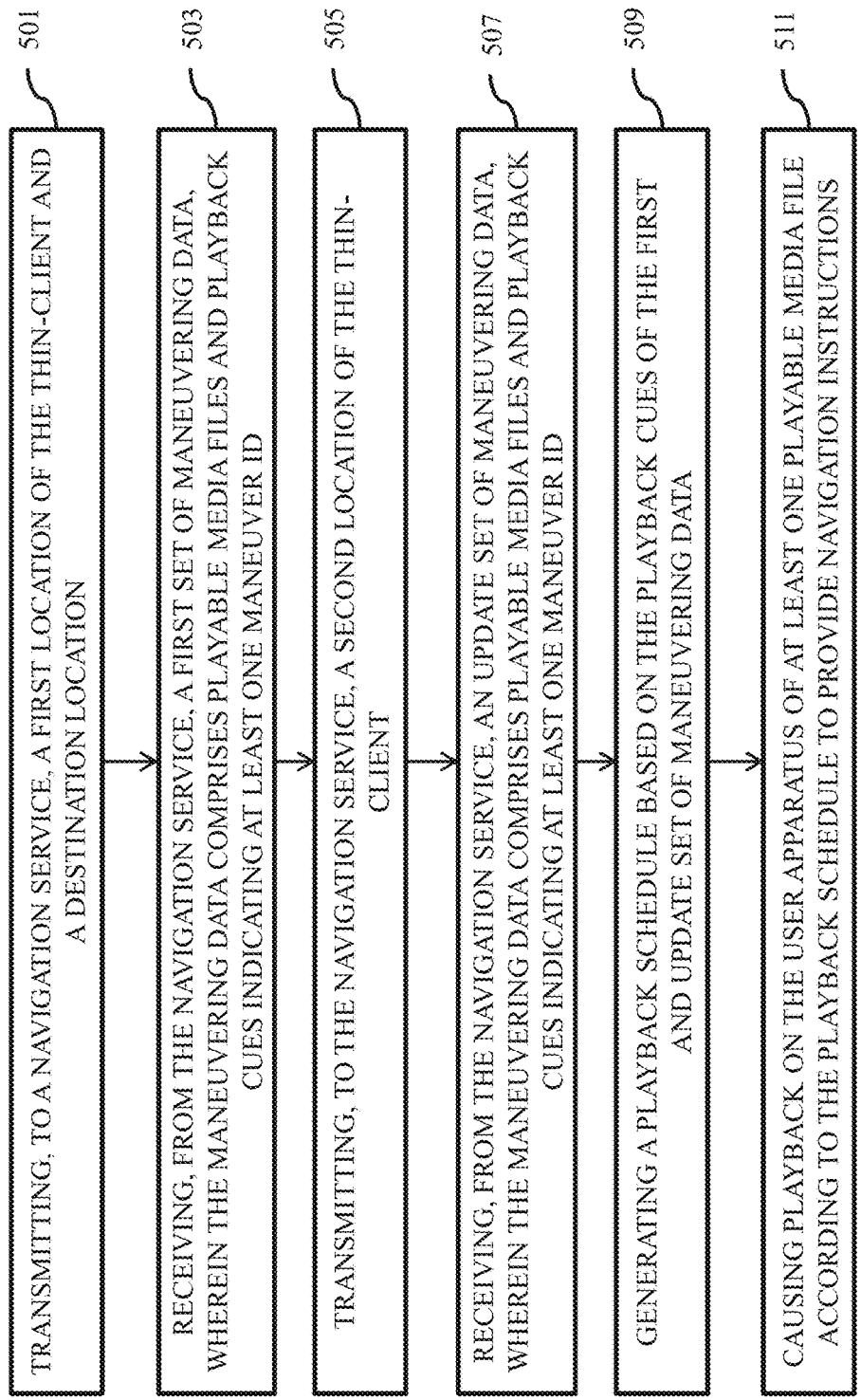

METHODS AND APPARATUSES FOR PROVIDING NAVIGATION INSTRUCTIONS

RELATED APPLICATION

This application claims priority from U.S. Provisional Application Ser. No. 63/027,712, entitled "METHODS AND APPARATUSES FOR PROVIDING NAVIGATION INSTRUCTIONS," filed on May 20, 2020, the contents of which are hereby incorporated herein in their entirety by this reference.

TECHNOLOGICAL FIELD

The present disclosure generally relates to routing and navigation systems, and more particularly relates to providing navigation instructions for routing and navigation systems.

BACKGROUND

Currently, there are various navigation techniques to provide navigation instructions from a current location to a destination location. Generally, these navigation techniques are implemented using a client/server configuration. In the client/server configuration, the processing of data for providing navigation related services is split between at least two computing systems, a client and a server, connected by a communication medium or a network. The splitting of the processing between the client and the server requires that a hardware client must possess a good amount of processing power, large storage space, a high quality user interface for presenting an optimum quality of data output for navigation services and often times support for additional computational resources to perform necessary computations at the client end for providing the navigation instructions. The client hardware sufficing all the requisite parameters for processing, storage and output interfacing can become a highly heavy weight component in computational power and features, and thus must come at a heavy price. However, with navigation services changing and evolving at such rapid pace, even a heavyweight client hardware may soon become obsolete and may need to be replaced with a hardware supporting some additional features, again leading to high cost investment from a user of the client hardware.

Accordingly, there is a need for methods for providing client hardware or a user apparatus which can support different types of navigation services at low cost. Further, the user apparatus may be dependent on reliable and responsive communication with the server for providing the navigation services. However, many times communication data is relatively unreliable, due to gaps caused by poor reception, due to unresponsiveness of server, or due to delays in switching the data through a network. Thus, there is also a need for the user apparatus to provide reliable and seamless flow of communication for providing navigation services.

BRIEF SUMMARY OF SOME EXAMPLE EMBODIMENTS

Various embodiments provide for a user apparatus with a simple low-cost hardware for accurately providing navigation instructions. Such a low-cost hardware may also be referred to as a thin-client, because it may support minimal processing and interfacing related functions. Hereinafter, "user apparatus with a simple low-cost hardware" and "thin-client" may be interchangeably used to mean the same.

The thin-client may possess basic computational resources and may still be able to provide navigation related functions for a vast variety of navigation applications. One such function may be to provide route guidance for a user of the thin-client to navigate to a destination location. Various embodiments provide for transmitting a destination location and a thin-client location from the thin-client to a navigation service such as a server. The thin-client may be configured for receiving the destination location as an input from the user in the form of an audio data or from a touch interface, such as in the form of a video data. For instance, the destination location may be received from the user as a voice message ("Navigate to Airport") or as a touch position coordinates on the touch interface of the thin client.

Various embodiments provide for calculating a route from the thin-client location to the destination location. For instance, the navigation service may be configured to calculate the route from the thin-client location to the destination. Various embodiments provide for generating, for a predetermined time period, a first set of maneuvering data corresponding to the calculated route. For instance, the navigation service may be configured to generate the first set of maneuvering data in response to the thin-client location received from the thin-client. The generated maneuvering data may comprise one or more playback cues for a set of upcoming maneuvers for the predetermined time period. For example, the maneuvering data may comprise playback cues for all upcoming maneuvers that the thin client may need to perform in a future time period of say 2 minutes. These upcoming maneuvers may be computed by the navigation service based on the destination location and the thin-client's current location. The playback cue for a maneuver may comprise a timestamp, and a maneuver ID. The timestamp may indicate a time instance to play a playable media file. The maneuver ID may be a hash function of the timestamp and the playable media file. Various embodiments provide for synthetizing playable media files for the set of upcoming maneuvers for the predetermined time period. In some embodiments, the one or more playback cues may be instructions/guides to play the synthetized playable media files. To that end, the maneuvering data may comprise the playback cues and the playable media files. The playable media file for the maneuver may comprise at least one maneuver instruction describing the maneuver. The playable media file may comprise the maneuver instruction in an audio format, a video format, or a combination thereof. As used herein, the predetermined time period may be a time period, which may be a duration of time associated with a predetermined time threshold from a time the thin-client location was received. Various embodiments provide for determining the predetermined time period. Various embodiments provide for transmitting the generated maneuvering data to the thin-client. For instance, the navigation service may be configured to transmit the generated maneuvering data to the thin-client in response to the thin-client location received from the thin-client.

Various embodiments may also provide for constantly transmitting a thin-client location to the navigation service with a predefined frequency until the destination location is reached. For instance, the thin-client location may be transmitted every five seconds until the destination location is reached.

Various embodiments provide for generating the maneuvering data for each received thin-client location for a subsequent predetermined time period. As used herein, the subsequent predetermined time period may be a time period, which may be a duration of time associated with a predetermined time threshold corresponding to a time when the thin-client location was received. Various embodiments provide for calculating the update set of maneuvering data for each received thin-client location based on the previously generated maneuvering data for the previously received thin-client location and the currently generated maneuvering data for the currently received thin-client location. Various embodiments provide for transmitting, to the thin-client, the update set maneuvering data for each received thin-client location.

Various embodiments provide for receiving the maneuvering data in response to transmitting the thin-client location. Various embodiments provide for generating the playback schedule based on the previously received maneuvering data and the current received maneuvering data. Various embodiments provide for causing the generated playback schedule to play on the thin-client for providing the navigation instructions. For instance, the playable media files of the maneuvering data are outputted according to the generated playback schedule. To that end, the navigation instructions may be provided on time even if a connection between a client and a server is lost or corresponds to a high latency connection.

Apparatuses and methods are provided in accordance with an example embodiment described herein for providing the navigation instructions.

In one aspect, a method for providing navigation instructions is disclosed. The method may comprise receiving, from a user apparatus, a first location and a destination location; calculating a first route from the first location to the destination location; generating, for a predetermined time period, a first set of maneuvering data corresponding to the first route, wherein the first set of maneuvering data comprises playback cues based on a predicted user apparatus location; transmitting the first set of maneuvering data to the user apparatus; receiving, from the user apparatus, a second location; generating, for a subsequent predetermined time period, a second set of maneuvering data, wherein the second set of maneuvering data comprises playback cues based on a further predicted user apparatus location; calculating an update set of maneuvering data based on the first and second set of maneuvering data; and transmitting the update set of maneuvering data to the user apparatus for providing navigation instructions.

According to some embodiments, generating the second set of maneuvering data may further comprise: map-matching the second location; calculating a second route based on the second location and the destination location in response to the map-matched second location not corresponding to the first route; replacing the first route with the second route; and transmitting an indication to the user apparatus to clear a playback schedule.

According to some embodiments, the method may further comprise: calculating a delete set of maneuvering data based on the first and second set of maneuvering data; and transmitting an instruction message to the user apparatus, said message identifying at least one maneuver to be deleted.

According to some embodiments, generating the first set of maneuvering data and the second set of maneuvering data may further comprise: synthetizing a playable media file describing a corresponding maneuver of the maneuvering data sets, and wherein the playable media file comprises audio, video or a combination thereof.

According to some embodiments, synthetizing the playable media file may further comprise retrieving data, based on a subscription type of the user apparatus, from at least one of: a 2D or 3D road model dataset, a street name dataset, a POI dataset, a landmark dataset, and a 2D or 3D building model dataset.

According to some embodiments, synthetizing the playable media file may further comprise selecting a playable media file quality based on a subscription type of the user apparatus, a configuration of the user apparatus, an available communication bandwidth of the user apparatus, or a combination thereof.

According to some embodiments, the playback cues further comprise for a maneuver: a timestamp based on the predicted location, and a maneuver ID.

According to some embodiments, the predetermined time period is determined based on one or more of a network connectivity status of the user apparatus, traffic conditions in a region associated with a route of travel of the user apparatus, a geographical terrain associated with the route of travel of the user apparatus, a service type subscription of the user apparatus and configuration information of the user apparatus.

In another aspect, a method for providing navigation instructions is disclosed. The method may comprise transmitting, to a navigation service, a first location of a user apparatus and a destination location; receiving, from the navigation service, a first set of maneuvering data, wherein the maneuvering data comprises playable media files and playback cues indicating at least one maneuver ID; transmitting, to the navigation service, a second location of the user apparatus; receiving, from the navigation service, an update set of maneuvering data, wherein the update set of maneuvering data comprises updated playable media files and updated playback cues indicating at least one maneuver ID; generating a playback schedule based on the playback cues of the first and update set of maneuvering data; and causing playback on the user apparatus of at least one playable media file according to the playback schedule to provide navigation instructions.

According to some embodiments, generating the playback schedule further comprises: determining if a maneuver ID of a playback cue is present on the playback schedule; overwriting the playback cue with a more recently received playback cue matching the maneuver ID in response of the maneuver ID being present on the playback schedule; and adding the playback cue to the playback schedule in response of the maneuver ID not being present on the playback schedule.

According to some embodiments, the method may further comprise removing the at least one maneuver from the playback schedule in response to receiving an indication to remove at least one maneuver.

In yet another aspect, an apparatus for providing instructions is disclosed. The apparatus may comprise a memory configured to store computer-executable instructions; and one or more processors configured to execute the instructions to: receive, from a user apparatus, a first location and a destination location; calculate a first route from the first location to the destination location; generate, for a predetermined time period, a first set of maneuvering data corresponding to the first route, wherein the first set of maneuvering data comprises playback cues based on a predicted user apparatus location; transmit the first set of maneuvering data to the user apparatus; receive, from the user apparatus, a second location; generate, for a subsequent predetermined time period, a second set of maneuvering data, wherein the second set of maneuvering data comprises playback cues based on a further predicted user apparatus location; calculate an update set of maneuvering data based on the first and second set of maneuvering data; and transmit the update set of maneuvering data to the user apparatus for providing navigation instructions.

According to some embodiments, to generate the second set of maneuvering data, the one or more processors may be further configured to: map-match the second location; in response to the map-matched second location not corresponding to the first route, calculate a second route based on the second location and the destination location; replace the first route with the second route; and transmit an indication to the user apparatus to clear a playback schedule.

According to some embodiments, the one or more processors may be further configured to: calculate a delete set of maneuvering data based on the first and second set of maneuvering data; and transmit an instruction message to the user apparatus, said message identifying at least one maneuver to be deleted.

According to some embodiments, to generate the first set of maneuvering data and the second set of maneuvering data, the one or more processors may be further configured to synthetize a playable media file describing a corresponding maneuver of the maneuvering data sets, and wherein the playable media file comprises audio, video or a combination thereof.

According to some embodiments, to synthetize the playable media file, the one or more processors may be further configured to retrieve data, based on a subscription type of the user apparatus, from at least one of: a 2D or 3D road model dataset, a street name dataset, a POI/Landmark dataset, and a 2D or 3D building model dataset.

According to some embodiments, to synthetize the playable media file, the one or more processors may be further configured to select a playable media file quality based on a subscription type of the user apparatus, a configuration of the user apparatus, an available communication bandwidth of the user apparatus, or a combination thereof.

According to some embodiments, the playback cues further comprise for a maneuver: a timestamp based on the predicted location, a maneuver ID, and a playable media file.

In yet another aspect, an apparatus for providing navigation instructions is disclosed. The apparatus may comprise a memory configured to store computer-executable instructions; and one or more processors configured to execute the instructions to: transmit, to a navigation service, a first location of a user apparatus and a destination location; receive, from the navigation service, a first set of maneuvering data, wherein the maneuvering data comprises playable media files and playback cues indicating at least one maneuver ID; transmit, to the navigation service, a second location of the user apparatus; receive, from the navigation service, an update set of maneuvering data, wherein the updated maneuvering data comprises updated playable media files and updated playback cues indicating at least one maneuver ID; generate a playback schedule based on the playback cues of the first and update set of maneuvering data; and cause playback on the user apparatus of at least one playable media file according to the playback schedule to provide navigation instructions.

According to some embodiments, to generate the playback schedule, the one or more processors may be further configured to: determine if a maneuver ID of a playback cue is present on the playback schedule; in response of the maneuver ID being present on the playback schedule, over-write the playback cue with a more recently received playback cue matching the maneuver ID; and in response of the maneuver ID not being present on the playback schedule, add the playback cue to the playback schedule.

According to some embodiments, the one or more processors may be further configured to in response to receiving an indication to remove at least one maneuver, remove the at least one maneuver from the playback schedule.

In yet another aspect, a computer program product comprising a non-transitory computer readable medium having stored thereon computer executable instruction which when executed by one or more processors, cause the one or more processors to carry out operations for providing navigation instructions, the operations comprising: receiving, from a user apparatus, a first location and a destination location; calculating a first route from the first location to the destination location; generating, for a predetermined time period, a first set of maneuvering data corresponding to the first route, wherein the first set of maneuvering data comprises playback cues based on a predicted user apparatus location; transmitting the first set of maneuvering data to the user apparatus; receiving, from the user apparatus, a second location; generating, for a subsequent predetermined time period, a second set of maneuvering data, wherein the second set of maneuvering data comprises playback cues based on a further predicted user apparatus location; calculating an update set of maneuvering data based on the first and second set of maneuvering data; and transmitting the update set of maneuvering data to the user apparatus for providing navigation instructions.

In yet another aspect, a computer program product comprising a non-transitory computer readable medium having stored thereon computer executable instruction which when executed by one or more processors, cause the one or more processors to carry out operations for providing navigation instructions, the operations comprising: transmitting, to a navigation service, a first location of a user apparatus and a destination location; receiving, from the navigation service, a first set of maneuvering data, wherein the maneuvering data comprises playable media files and playback cues indicating at least one maneuver ID; transmitting, to the navigation service, a second location of the user apparatus; receiving, from the navigation service, an update set of maneuvering data, wherein the update set of maneuvering data comprises updated playable media files and updated playback cues indicating at least one maneuver ID; generating a playback schedule based on the playback cues of the first and update set of maneuvering data; and causing playback on the user apparatus of at least one playable media file according to the playback schedule to provide navigation instructions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
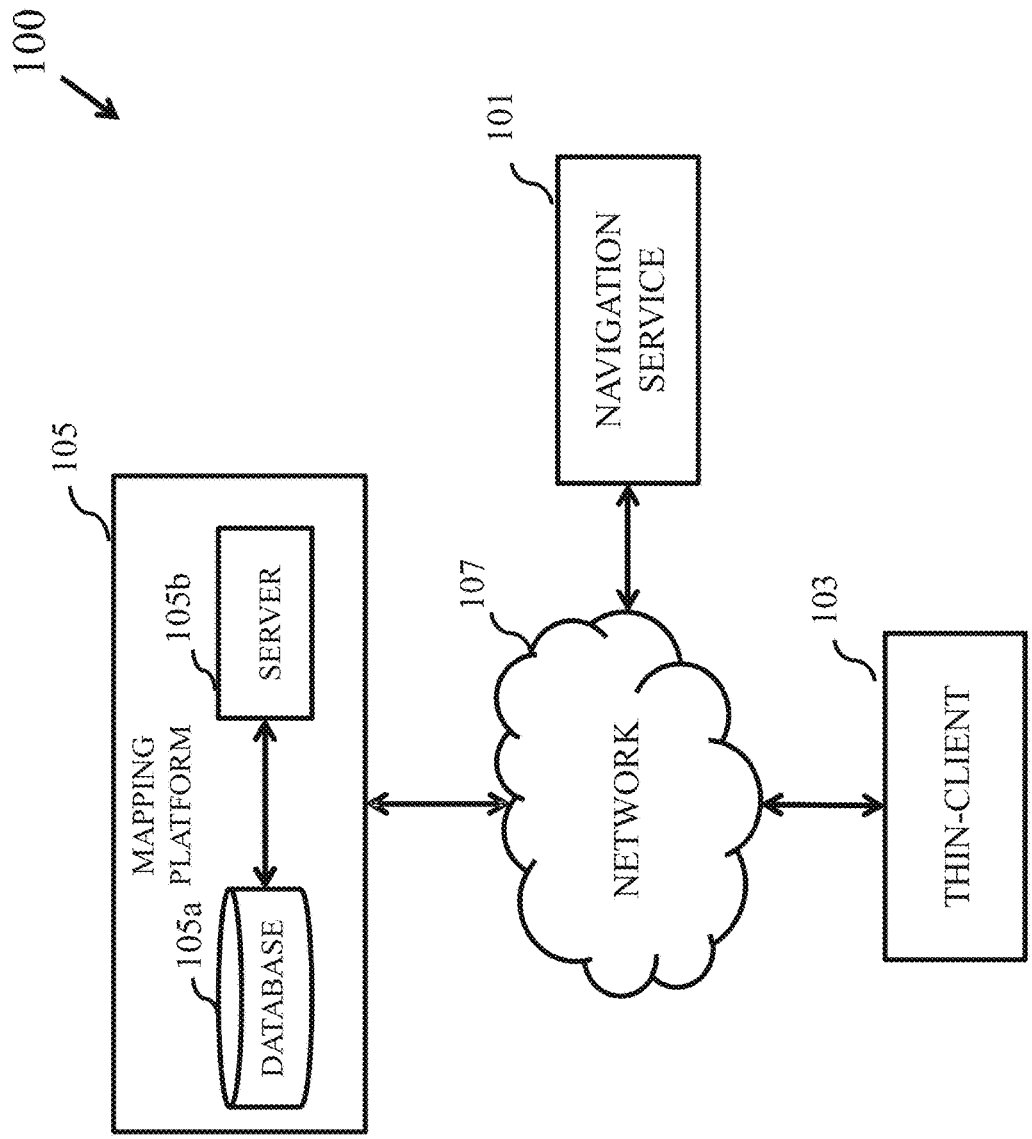
Figure 2:
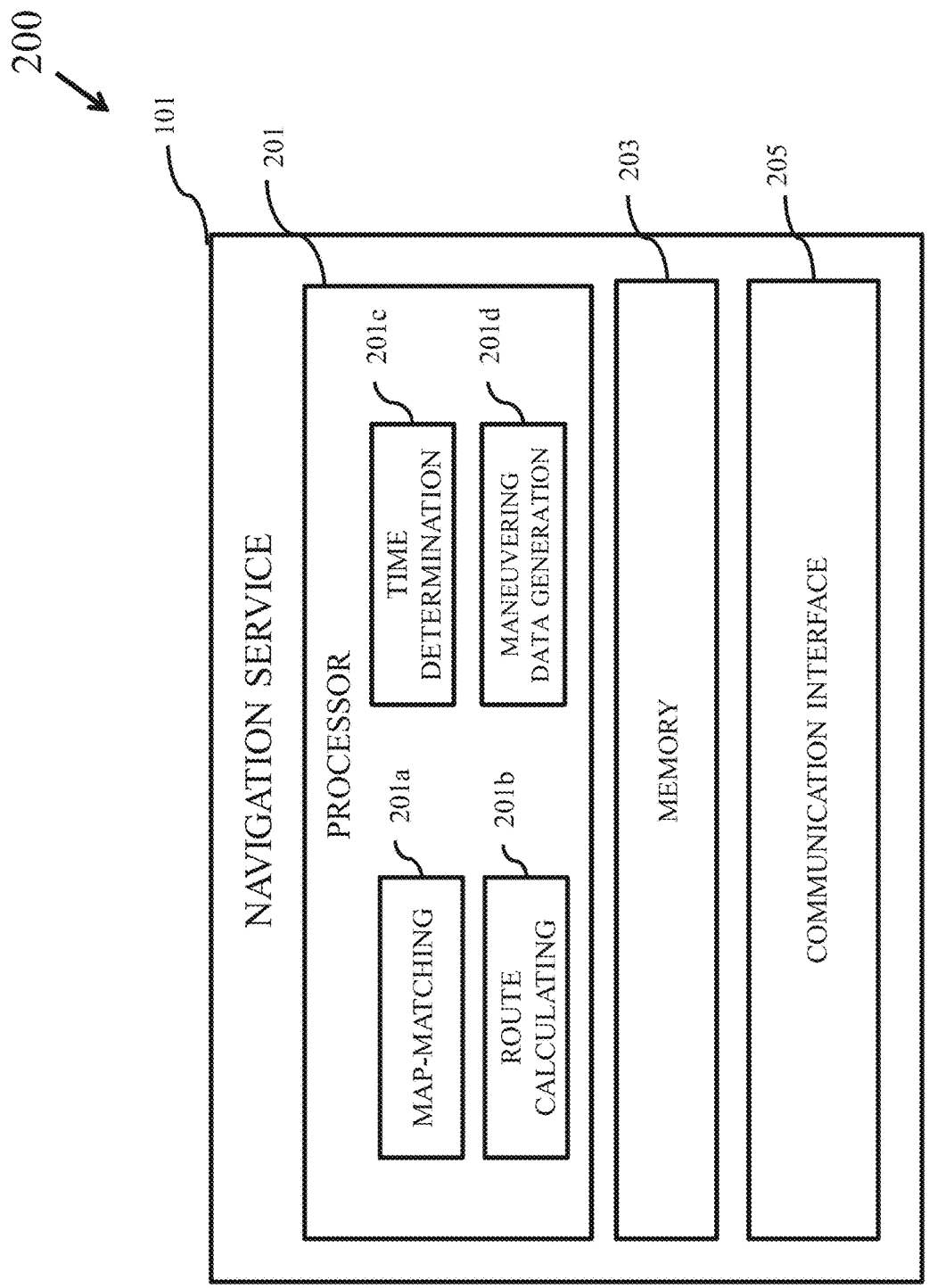
Figure 3:
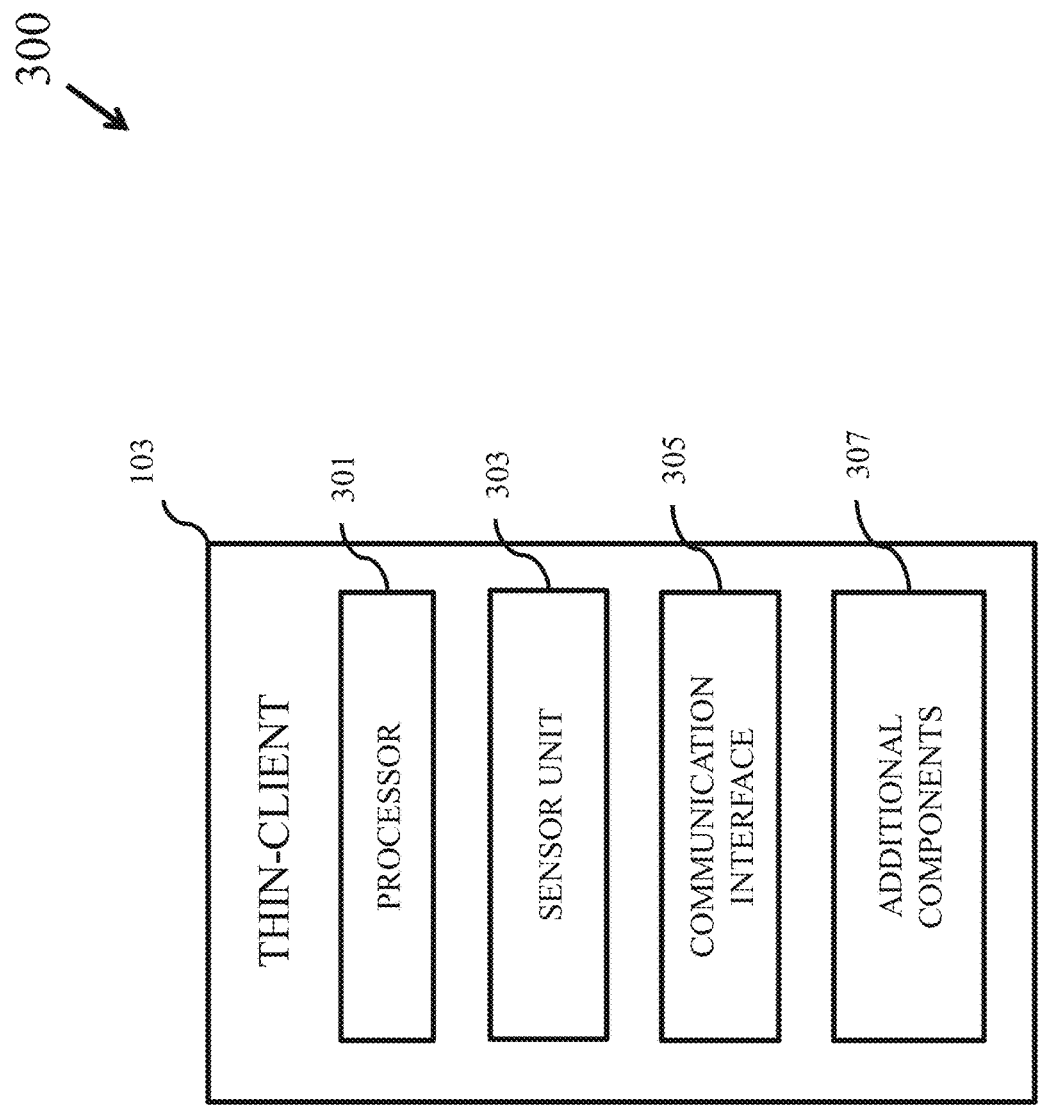
Figure 4A:
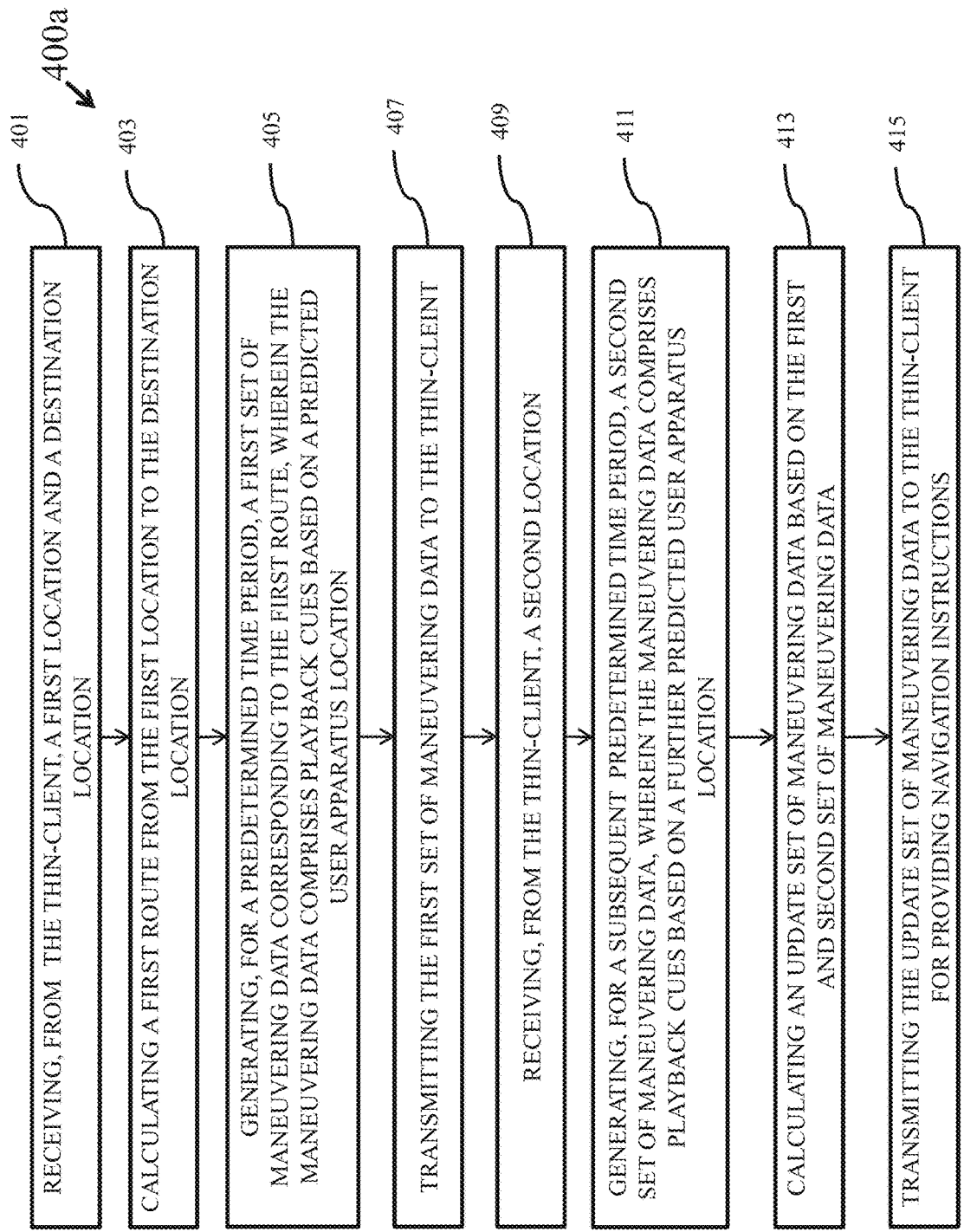
Figure 4B:
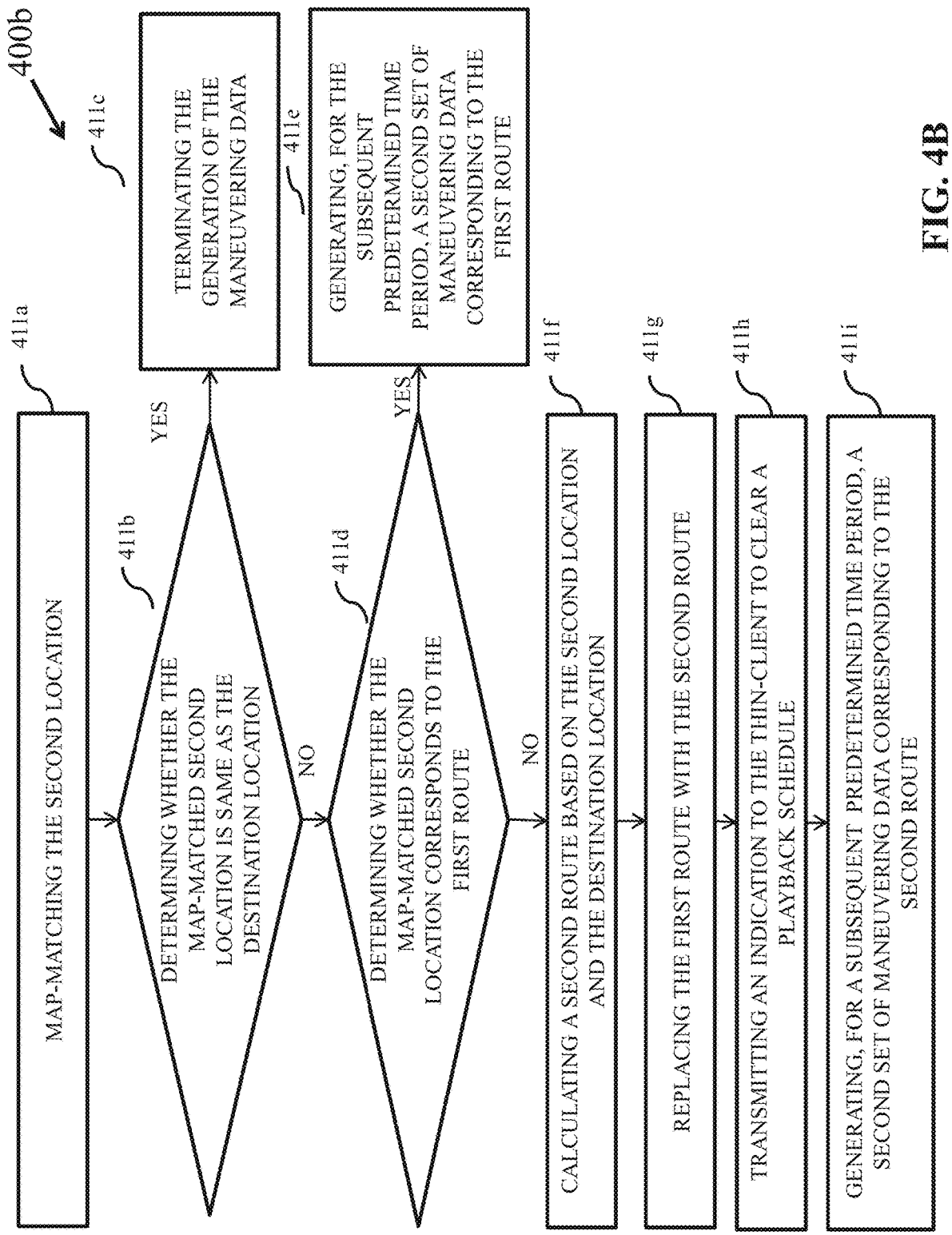
Figure 5B:
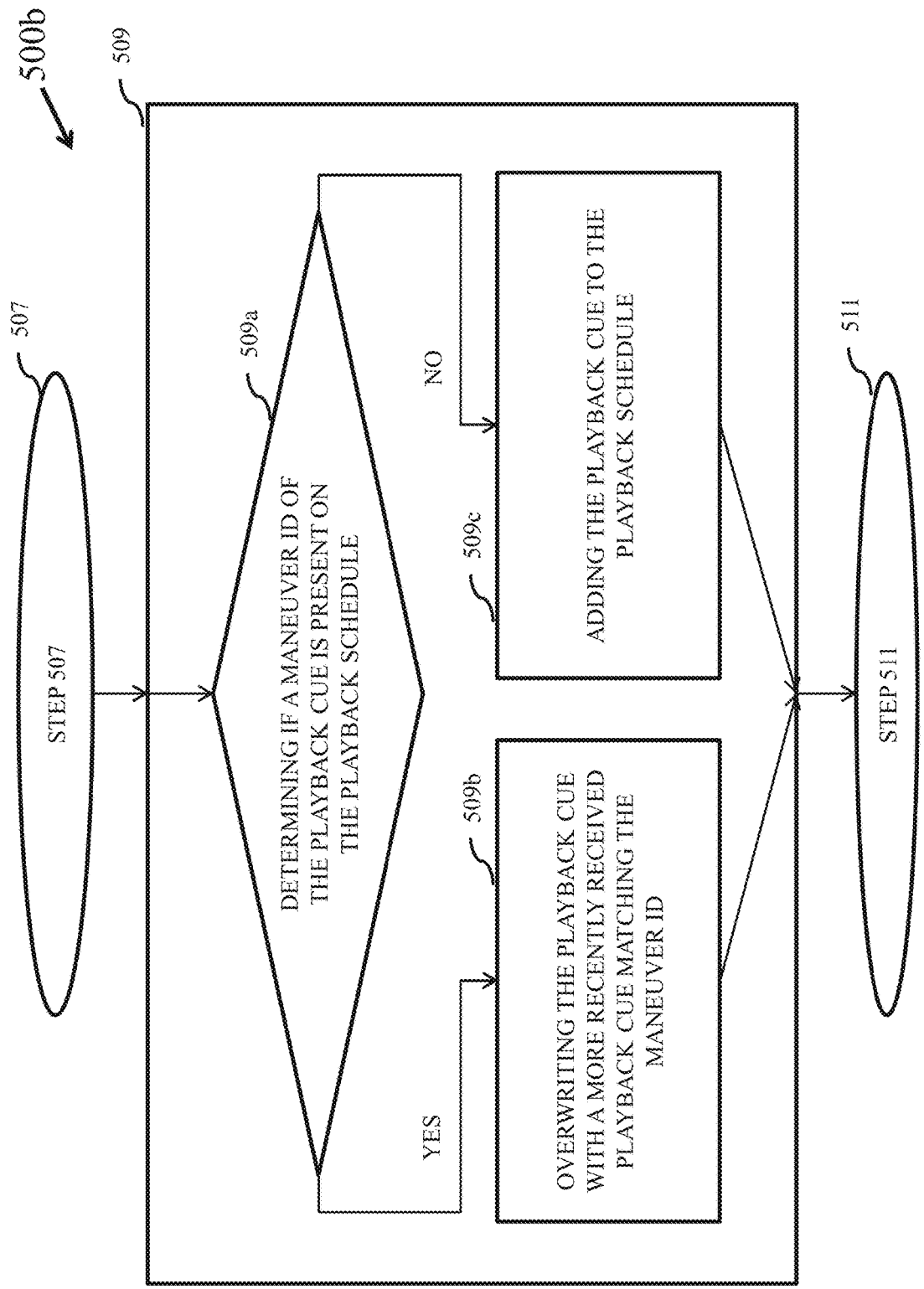
Figure 6A:
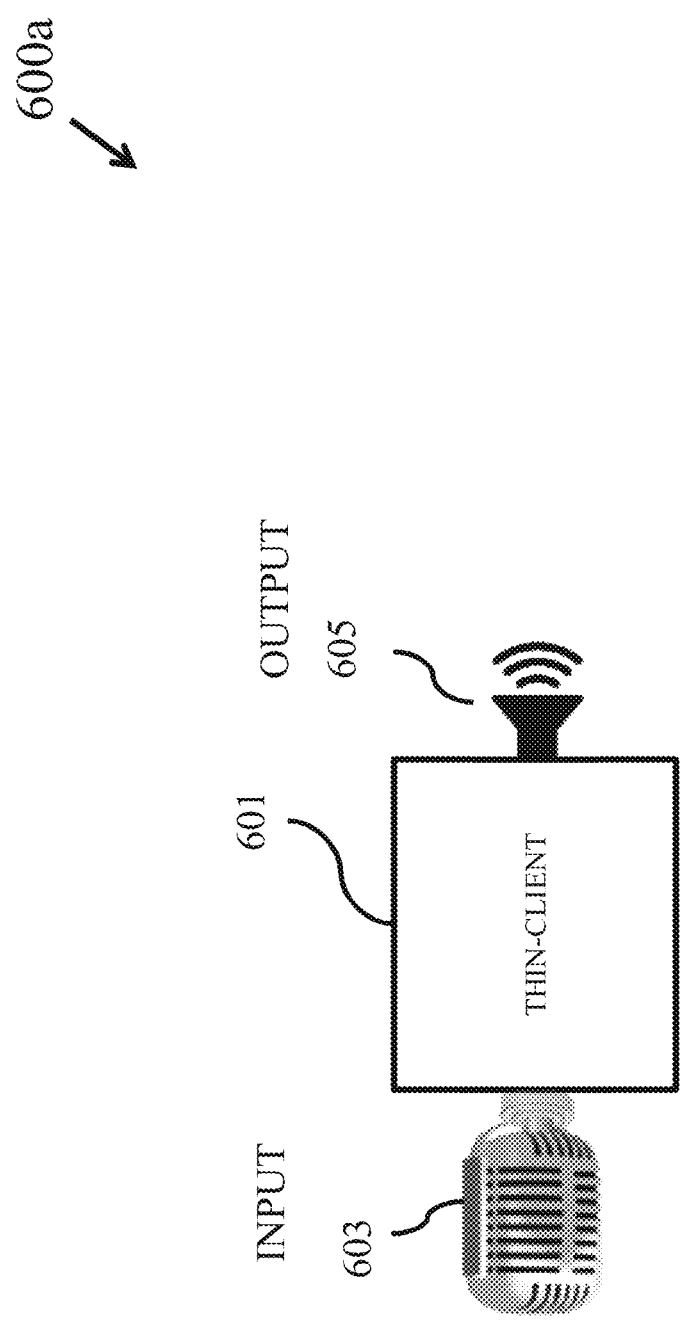
Figure 6B:
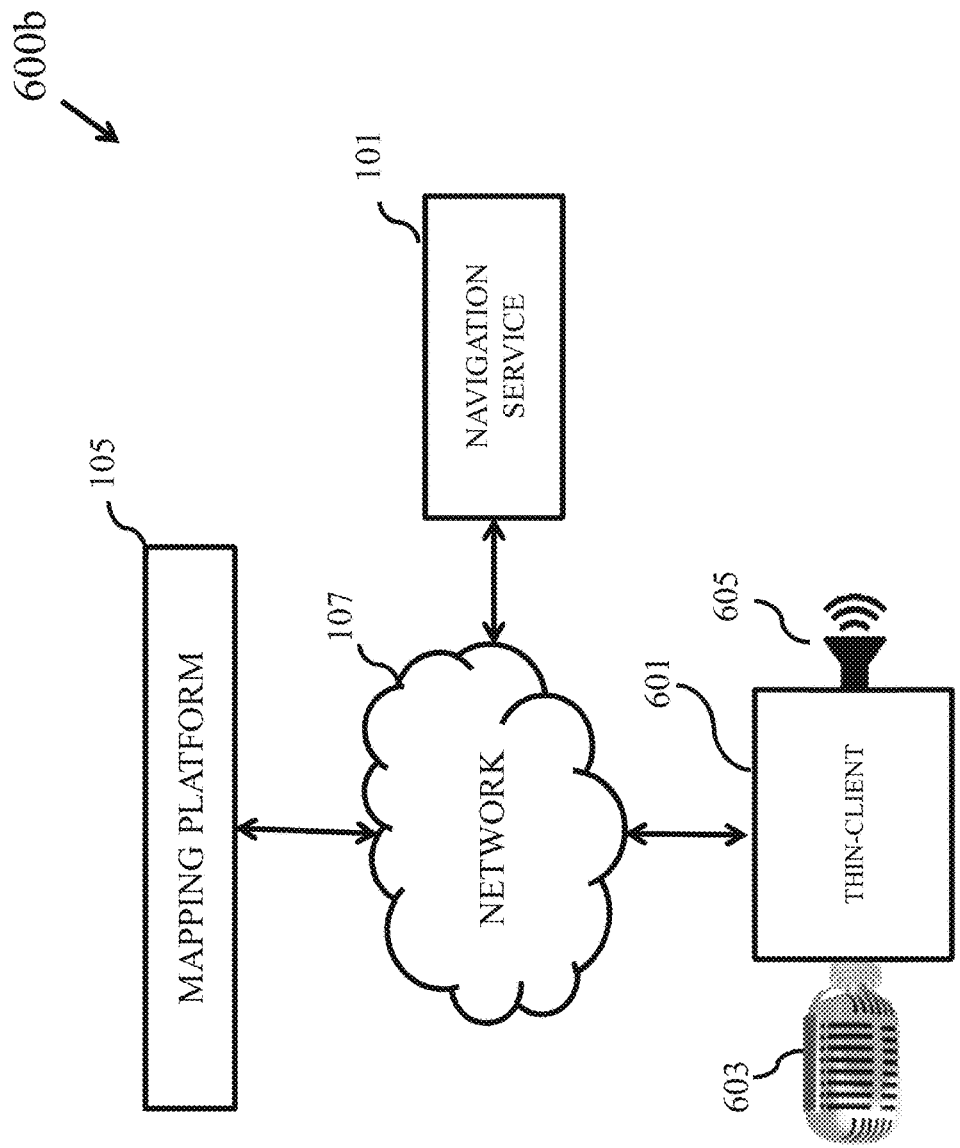
Figure 6C:
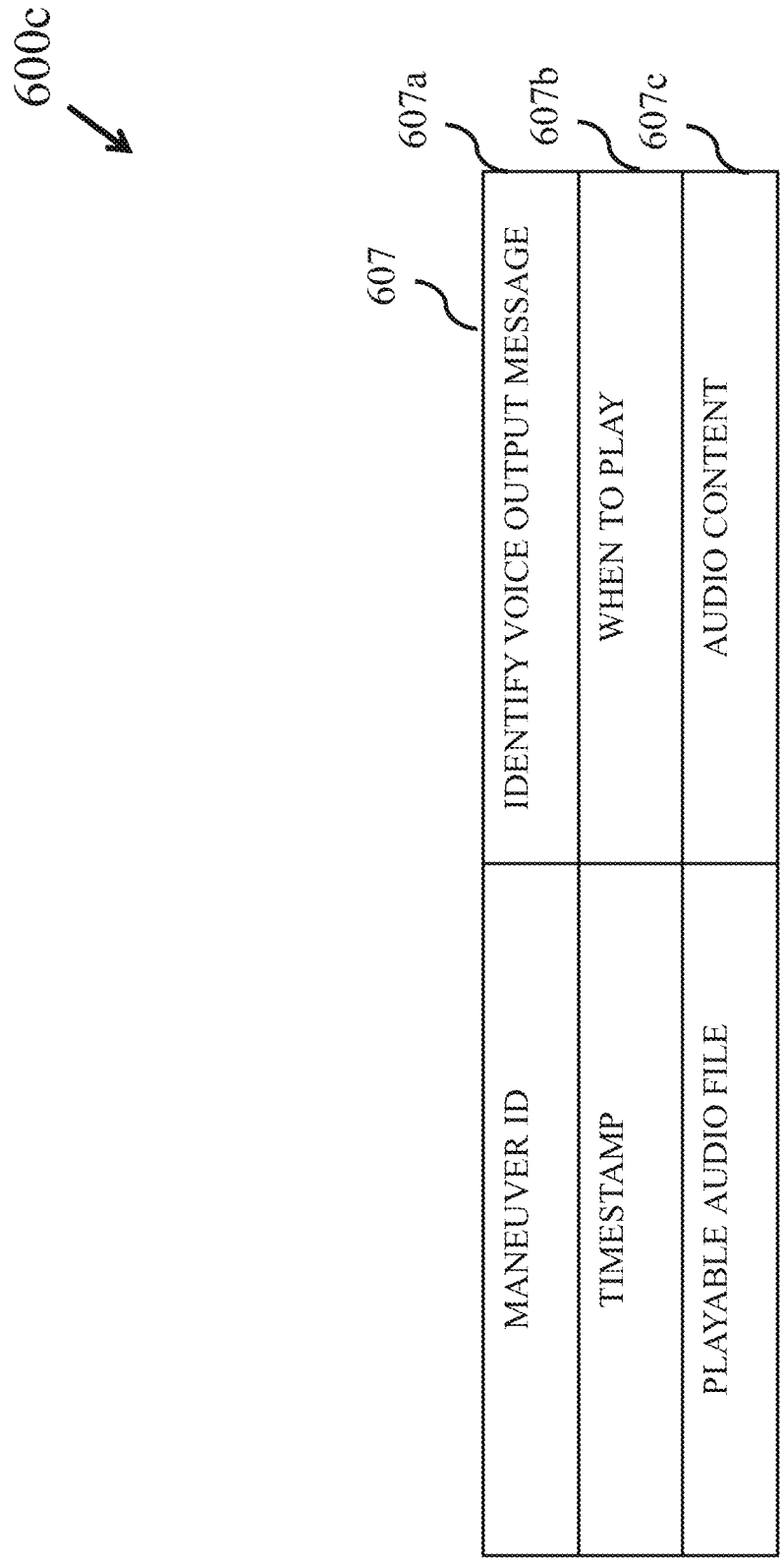
Figure 7A:
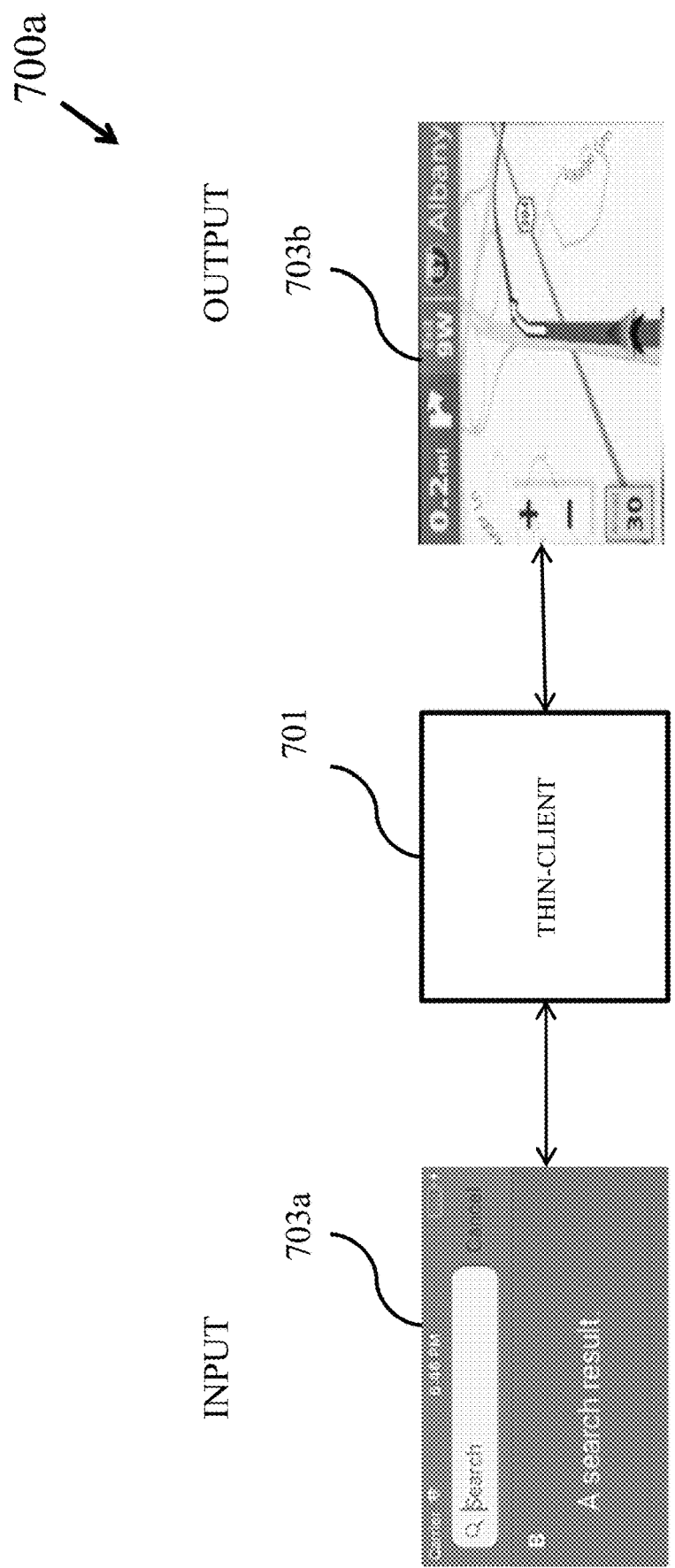
Figure 7B:
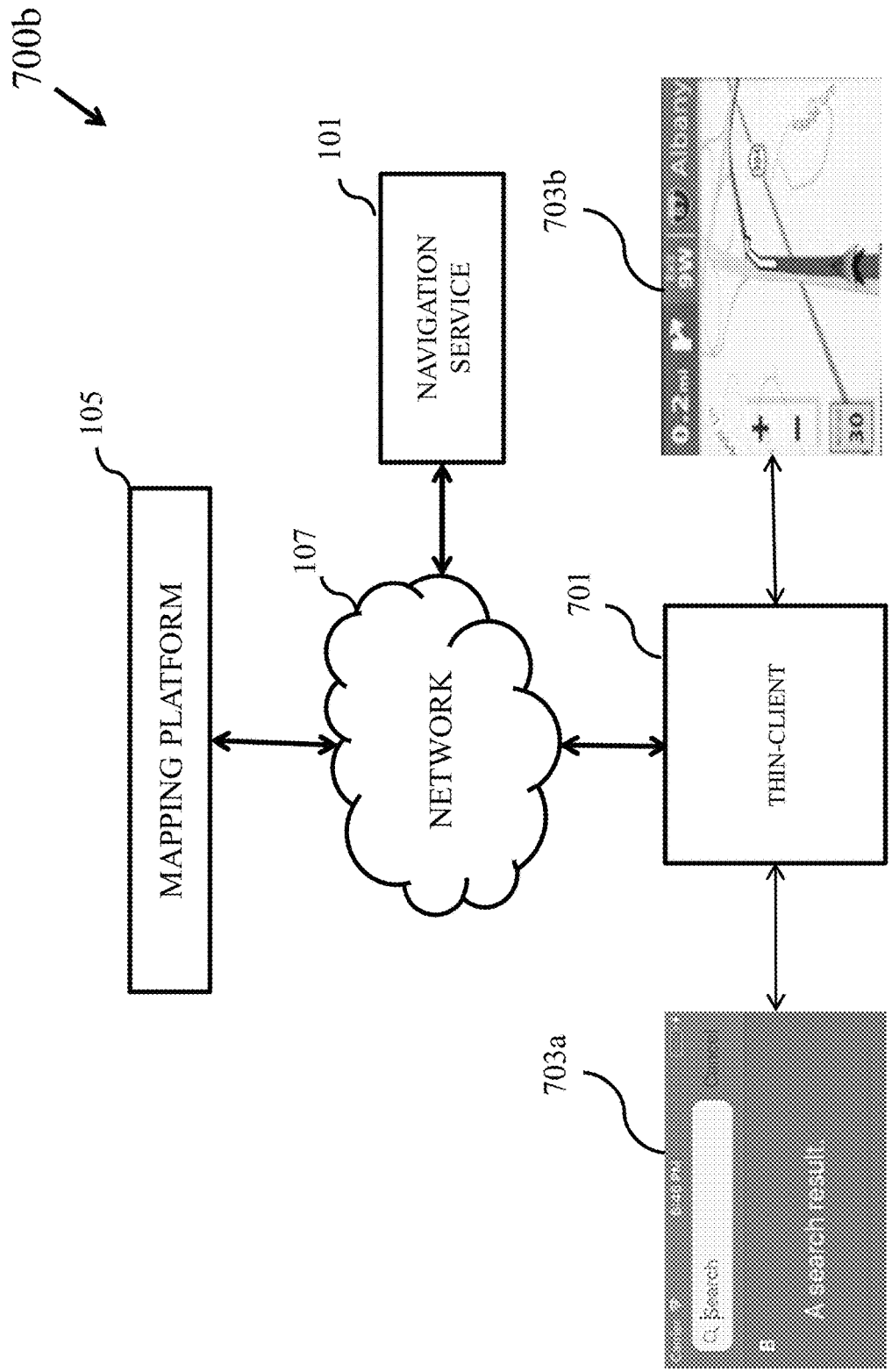
Figure 7C:
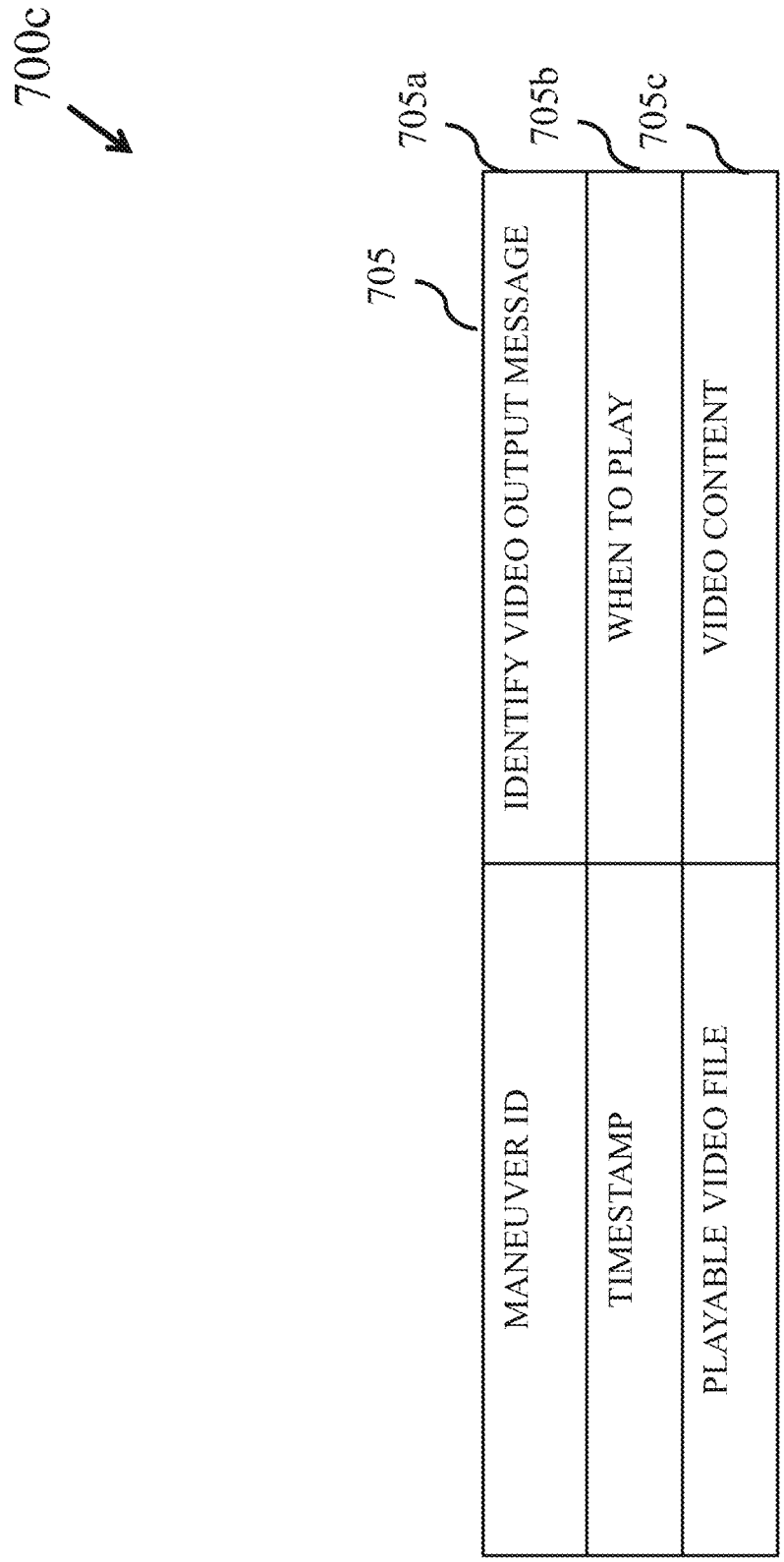
Figure 8:
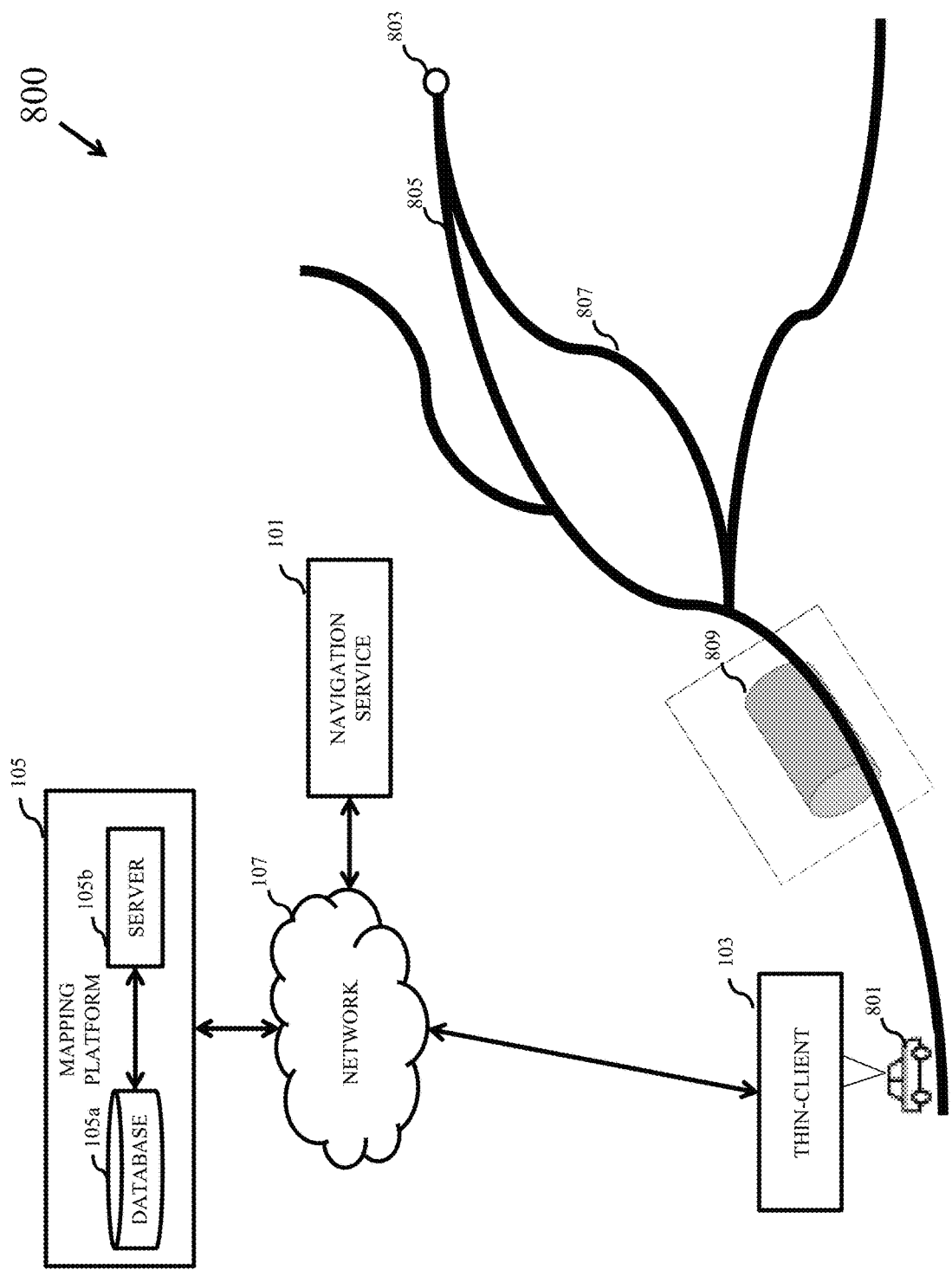

Having thus described example embodiments of the invention in general terms, reference will now be made to the accompanying drawings, which are not necessarily drawn to scale, and wherein:

FIG. 1 illustrates a block diagram showing an example system architecture of one or more example embodiments of the present invention;

FIG. 2 illustrates a block diagram of a navigation service for providing navigation instructions, in accordance with one or more example embodiments;

FIG. 3 illustrates a block diagram of a thin-client for providing navigation instructions, in accordance with one or more example embodiments;

FIGS. 4A-4B illustrate a flowchart depicting a method executed by the navigation service for providing the navigation instructions, in accordance with one or more example embodiments;

FIGS. 5A-5B illustrate a flowchart depicting a method executed by the thin-client for providing the navigation instructions, in accordance with one or more example embodiments;

FIG. 6A illustrates a schematic diagram of a thin-client for providing voice-based navigation instructions, in accordance with one or more example embodiments;

FIG. 6B illustrates a schematic diagram showing an example system architecture for providing the voice-based navigation instructions, in accordance with one or more example embodiments;

FIG. 6C illustrates exemplary maneuvering data for providing the voice-based navigation instructions, in accordance with one or more example embodiments;

FIG. 7A illustrates a schematic diagram of a thin-client for providing video-based navigation instructions, in accordance with one or more example embodiments;

FIG. 7B illustrates a schematic diagram showing an example system architecture for providing the video-based navigation instructions, in accordance with one or more example embodiments;

FIG. 7C illustrates exemplary maneuvering data for providing the video-based navigation instructions, in accordance with one or more example embodiments; and FIG. 8 illustrates an exemplary scenario for providing the navigation instructions, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses/systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A method and an apparatus are provided for providing navigation instructions. Various embodiments are provided to transmit a destination location and a thin-client location from the thin-client to the navigation service. Various embodiments provide for calculating a route from the thin-client location to the destination location. For instance, the navigation service may be configured to calculate the route from the thin-client location to the destination. Various embodiments provide for generating, for a predetermined time period, a first set of maneuvering data corresponding to the calculated route. For instance, the navigation service may be configured to generate the first set of maneuvering data in response to the thin-client location received from the thin-client. The generated maneuvering data may comprise one or more playback cues for a set of upcoming maneuvers for the predetermined time period. For example, the maneuvering data may comprise playback cues for all upcoming maneuvers that the thin client may need to perform in a future time period of e.g. 2 minutes. These upcoming maneuvers may be computed by the navigation service based on the destination location and the thin-client's current location. The playback cue for a maneuver may comprise a timestamp and a maneuver ID. The timestamp may indicate a time instance to play a playable media file. The maneuver ID may be a hash function of the timestamp and the playable media file. Various embodiments provide for synthetizing playable media files for the set of upcoming maneuvers for the predetermined time period. In some embodiments, the one or more playback cues may be instructions/guides to play the synthetized playable media files. To that end, the maneuvering data may comprise the playback cues and the playable media files. The playable media file for the maneuver may comprise at least one maneuver instruction describing the maneuver. The playable media file may comprise the maneuver instruction in an audio format, a video format, or a combination thereof. As used herein, the predetermined time period may be a time period, which may be ahead in time by a predetermined time threshold, such as 2 minutes, from a time the thin-client location was received. Various embodiments provide for determining the predetermined time period. Various embodiments provide for transmitting the generated maneuvering data to the thin-client. For instance, the navigation service may be configured to transmit the generated maneuvering data to the thin-client in response to the thin-client location received from the thin-client.

Various embodiments may also provide for constantly transmitting a thin-client location to the navigation service with a predefined frequency until the destination location is reached. For instance, the thin-client location may be transmitted e.g. every five seconds to the navigation service, until the destination location is reached.

Various embodiments provide for generating the maneuvering data for each received thin-client location for a subsequent predetermined time period. As used herein, the subsequent predetermined time period may be a time period of a duration associated with a time when a subsequent corresponding thin-client location was received. Various embodiments provide for calculating the update set of maneuvering data for each received thin-client location based on the previously generated maneuvering data for the previously received thin-client location and the currently generated maneuvering data for the currently received thin-client location. Various embodiments provide for transmitting, to the thin-client, the update set of maneuvering data for each received thin-client location.

Various embodiments provide for receiving the maneuvering data in response to transmitting the thin-client location. Various embodiments provide for generating the playback schedule based on the previously received maneuvering data and the current received maneuvering data. Various embodiments provide for causing the generated playback schedule to play on the thin-client for providing the navigation instructions. For instance, the playable media files of the maneuvering data are outputted according to the generated playback schedule. To that end, the thin-client may be provided with the maneuver instructions for up-coming maneuvers on a route for a future time, which may be a predetermined time window, such as a time window of 2 minutes for exemplary purpose. Therefore, even when the connection between navigation service, such as a server, and the thin-client is lost or corresponds to a high latency connection, the navigation instructions are still accurately provided on time.

FIG. 1 illustrates block diagram 100 showing example system architecture of one or more example embodiments.

As shown in FIG. 1, the block diagram 100 may include a navigation service 101, a thin-client (or a user apparatus) 103, a mapping platform 105, and a network 107. The mapping platform 105 may further comprise a database 105a and a server 105b. In various embodiments, the navigation service 101 may be a server (for instance, a backend server, a remotely located server, or the like), group of servers, distributed computing system, and/or other computing system. In some embodiments, the navigation service 101 may be the server and/or server cloud 105b of the mapping platform 105 and therefore may be co-located with or within the mapping platform 105. In an embodiment, the navigation service 101 may be co-located with or within an Original Equipment Manufacturer (OEM) cloud. In various embodiments, the navigation service 101 may be in communication with the thin-client 103 for providing navigation instructions.

In various embodiments, the thin-client 103 may be onboard a vehicle. The vehicle may be an autonomous vehicle, a semi-autonomous vehicle, or a manual vehicle. In various embodiments, the thin-client 103 may be a vehicle navigation system, vehicle control system, a mobile computing device, a mobile data gathering platform and/or the like. For example, the thin-client 103 may be an in vehicle navigation system mounted within and/or be onboard the vehicle such as a motor vehicle, non-motor vehicle, an automobile, car, scooter, truck, van, bus, motorcycle, bicycle, Segway, golf cart, and/or the like. In some embodiments, the thin-client 103 may be onboard a personal vehicle, commercial vehicle, public transportation vehicle, fleet vehicle, and/or other vehicle. The thin-client 103 may be any user accessible device such as a mobile phone, a smartphone, a media player, a portable computer, and the like that is portable in itself or as a part of another portable/mobile object such as the vehicle. In some example embodiments, the thin-client 103 may be associated, coupled, or otherwise integrated with the vehicle of the user, such as an advanced driver assistance system (ADAS), a personal navigation device (PND), a portable navigation device, an infotainment system and/or other device that may be configured to provide route guidance, navigation instructions to the user. In this context, the user may be an autonomous or semi-autonomous vehicle. The thin-client 103 may comprise processing means such as a central processing unit (CPU), storage means such as onboard read only memory (ROM) and random access memory (RANI), and position sensors such as a GNSS sensor for receiving GPS, GALILEO, GLONASS or similar positioning signals. Additionally or alternatively, the thin-client 103 may comprise acoustic sensors such as a microphone array, orientation sensors such as gyroscope, and motion sensors such as accelerometer. Additionally, in some embodiments, the thin-client 103 may comprise a speaker and a microphone. Additionally, in some other embodiments, the thin-client 103 may comprise a display enabled user interface such as a touch screen display, and other components as may be required for specific functionalities of the thin-client 103. In an embodiment, the thin-client 103 may be a low-cost voice enabled device, such as Alexa, that may be coupled to a high speed network like an LTE or 5G network, such as the network 107. In other embodiments, the thin-client 103 may be a low cost video enabled device coupled to such a high speed network. In various embodiments, the thin-client 103 may be in communication with the navigation service 101 for specific functionalities of the thin-client 103, via the network 107. To that end, the navigation service 101 may also be the mapping platform 105.

The mapping platform 105 may comprise the database 105a for storing map data and the server 105b. The database 105a may store node data, road segment data, link data, link identification information, heading value records, point of interest (POI) data, or the like. The database 105a may also store cartographic data, routing data, and/or maneuvering data. According to some example embodiments, the road segment data records may be links or segments representing roads, streets, or paths, as may be used in calculating a route or recorded route information for determination of one or more personalized routes. Further, the database 105a may store maneuvers associated with the links or road segments. Additionally, the database 105a may store maneuver instructions for performing the maneuvers associated with the links or road segments. The node data may be end points corresponding to the respective links or segments of road segment data. The road link data and the node data may represent a road network, such as used by vehicles, cars, trucks, buses, motorcycles, and/or other entities. Optionally, the database 105a may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 105a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 105a can include event data (e.g., traffic conditions, geographic terrains, high latency connection spots, and the like) associated with the road segment data of the database 105a. Optionally or additionally, the database 105a may store 3D building maps data (3D map model of objects) of structures surrounding roads and streets, a 2D or 3D road model dataset, a street name dataset, a POI/Landmark dataset, and a 2D or 3D building model dataset.

The database 105a may be maintained by a content provider e.g., a map developer. By way of example, the map developer may collect geographic data to generate and enhance the database 105a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The database 105a may be a master database stored in a format that facilitates updating, maintenance, and development. For example, the master database or data in the master database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as the thin-client 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

The server 105b may comprise processing means and communication means. For example, the processing means may comprise one or more processors configured to process requests received from the thin-client 103. The processing means may fetch map data from the database 105a and transmit the same to the thin-client 103 in a format suitable for use by the thin-client 103. In some embodiments, the mapping platform 105 may be configured to communicate with the thin-client 103 over the network 107.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In some example embodiments, the thin-client 103 may be configured for communicating with the navigation service 101 over the network 107 to provide navigation instructions.

FIG. 2 illustrates a block diagram 200 of the navigation service 101 for providing the navigation instructions, in accordance with one or more example embodiments. The navigation service 101 may include a processing means such as at least one processor 201, storage means such as a memory 203, and a communication means such as at least one communication interface 205. Further, the navigation service 101 may include a map-matching module 201*a*, a route calculating module 201*b*, a time determination module 201*c*, and a maneuvering data generation module 201*d*. In various embodiments, the map-matching module 201*a* may be configured to map-match the coordinates of the thin-client location to the most likely location on the road network, based on a map database available to the Navigation Service 101. In some embodiments, the map-matching module 201*a* may use speed data associated with the thin-client 103 and the heading direction data associated with the thin-client 103 along with the coordinates of the thin-client 103 to map-match the thin-client location. In various embodiments, the route calculating module 201*b* may be configured to calculate a route from the thin-client location to any other location, such as which may be a destination location. In various embodiments, the time determination module 201*c* may be configured to determine a future time period for generating the maneuvering data. In various embodiments, the maneuvering data generation module 201*d* may be configured to generate the maneuvering data for the predetermined time period (i.e. the time period determined by the time determination module 201*c*). Further, each of the modules 201*a*-201*d* may be embodied in the processor 201. The processor 201 may retrieve computer program code instructions that may be stored in the memory 203 for execution of computer program code instructions by the modules 201*a*-201*d*, which may be configured for providing the navigation instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with the memory 203 via the bus for passing information among components of structure 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the navigation service 101, where the users may be or correspond to the thin-client 103. The IoT related capabilities may in turn be used to provide navigation instructions by providing real time updates to the users of the thin-client 103. The navigation service 101 may be accessed using the communication interface 205. The communication interface 205 may provide an interface for accessing various features and data stored in the navigation service 101. For example, the communication interface 205 may comprise I/O interface which may be in the form of a GUI, a touch interface, a voice enabled interface, a keypad and the like for providing navigation related data. Such navigation related data may include information about upcoming conditions on a route, route display, alerts about vehicle speed, user assistance while driving, user assistance in maneuvers and the like.

FIG. 3 illustrates a block diagram 300 of the thin-client 103 for providing navigation instructions, in accordance with one or more example embodiments. The thin-client 101 may include a processor 301, a sensor unit 303, a communication interface 305, and additional components 307. The processor 301 may be embodied in a number of different ways. For example, the processor 301 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), a microcontroller unit (MCU), or the like.

In an example embodiment, the processor 301 may be in communication with the memory via a bus for passing information among components of structure 103. The memory may be embodied or located within the additional components 307. The memory may be non-transitory and may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor 301). In some embodiments, the memory may be constrained. For instance, the memory may be limited based on the operations of the thin-client 103. The memory may be configured to store information, data, content, applications, instructions, or the like, for enabling the thin-client 103 to carry out various functions in accordance with an example embodiment of the present invention. For example, the memory may be configured to buffer input data for processing by the processor 301. As exemplarily illustrated in FIG. 3, the memory may be configured to store instructions for execution by the processor 301. As such, whether configured by hardware or software methods, or by a combination thereof, the processor 301 may represent an entity (for example, physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present invention by further configuration of the processor 301 by instructions for performing the algorithms and/or operations described herein. The processor 301 may include, among other things, a clock, an arithmetic logic unit (ALU) and logic gates configured to support operation of the processor 301.

The sensor unit 303 may be configured to store position sensors such as GPS sensor. In some embodiments, the GPS sensor constantly tracks the thin-client location using a reference coordinate system, such as WGS84 (World Geodetic system-84). Additionally, in some embodiments, the sensor unit 303 may be configured to store orientation sensors such as gyroscope, and motion sensors such as accelerometer. The gyroscope sensor may be used to determine a heading direction of the thin-client 103. The accelerometer sensor may be used to determine a speed of the vehicle that includes the thin-client 103. The communication interface 305 may be an I/O interface for communicating with the navigation service 101. For instance, the thin-client may 103 accesses the location based maneuver data from the navigation service 101 via the communication interface 305. In some embodiments, the thin-client 103 may receive the location based maneuver data in an audio format. To that end, the additional components 307 may include a speaker and a microphone. For instance, the microphone is used for inputting a request to navigate from the current location to the destination location. The speaker is used to assist the user while navigating from the current location to the destination location, for example by presenting the audio in one or more of a mono, stereo, lossy or lossless audio waveform format. In some other embodiments, the thin-client 103 may receive the location based maneuver data based on touch positions sent from the thin-client. To that end, the additional components 307 may comprise a video display and a touch input sensor for the video display. For instance, the touch input sensor is used for inputting a request to navigate from the current location to the destination location. The video display is used to assist the user while navigating from the current location to the destination location for example by presenting upcoming maneuvers in the form of e.g. an 4K, FHD, HD or SD display.

FIG. 4A illustrates a flowchart depicting a method 400a executed by the navigation service 101 for providing navigation instructions, in accordance with one or more example embodiments. Starting at step 401, the method 400a may include receiving, from the thin-client 103, a thin-client location (for instance, a first location) and a destination location. In some embodiments, the navigation service 101 may receive the thin-client location from the thin-client 103. The received thin-client location may indicate a current location of the thin-client 103. In some embodiments, the navigation service 101 (for instance, the map-matching module 201a) may map-match the thin-client location in a geographical region (i.e. the map) to identify a corresponding road network map location (i.e. a map-matched location) of the thin-client 103 on the map. For instance, the map-matching module 201a may map-match the thin-client location to identify the corresponding location on the road network of the database 105a. In some example embodiments, the map-matching module 201a may use the speed data associated with the thin-client 103 and the heading data associated with the thin-client 103 along with the received coordinates of the thin-client 103 to map-match the thin-client location. To that end, the navigation service 101 may receive the speed data associated with the thin-client 103 and the heading data associated with the thin-client 103 along with the coordinates (i.e. the first location) of the thin-client 103. The navigation service 101 may further receive the destination location from the thin-client 103. In some embodiments, the navigation service 101 may receive the destination location as the audio data (e.g. the voice message comprising "Navigate to XYZ", where XYZ corresponds to the destination location). For instance, the navigation service 101 receives the audio data as an audio file (e.g. .wav, mp3, .aac, or the like) encoding an electrical signal (for instance, a waveform) from the thin-client 103. Further, the navigation service 101 may decode the audio data to determine the destination location. For instance, the navigation service 101 may use speech-to-text algorithms, natural language processing (NLP) algorithms, or the like, to decode the audio data to determine the destination location. In some other embodiments, the navigation service 101 may receive the destination location as a touch position on a video display. For example, when the navigation service 101 receives a touch input indicating turn-on of the thin-client 103, the navigation service 101 sends a still video with a phrase "Where do you want to navigate to" and a picture of a virtual keyboard to the thin-client 103. The navigation service 101 may wait for a touch input indicating a letter on the virtual keyboard; the navigation service 101 may add each received touch position to a set "PHRASE"; the navigation service 101 may search for a location using the set "PHRASE"; and the navigation service 101 may send a still video or an image file with the search result comprising the determined location and the virtual keyboard to the thin-client 103. The image file may include a .jpg file, a .png file or the like. In this way, the navigation service 101 may literately send the still videos or image files until the navigation service 101 receives a touch position, from the thin-client 103, indicating the user of the thin-client 103 has selected the search result in the still video or image file. The navigation service 101 may set the selected search result as the destination location.

At step 403, the method 400a may include calculating a route (for instance, a first route) from the thin-client location (i.e. the first location) to the destination location. For instance, the route calculating module 201b of the navigation service 101 may calculate the route using the map data of the database 105a. In some embodiments, the navigation service 101 may calculate the route from the map-matched thin-client location to the destination location. Additionally, in some embodiments, the navigation service 101 may create an empty set "SENT". The set "SENT" may store transmitted maneuvering data and currently scheduled maneuvering data at the thin-client 103.

At step 405, the method 400a may include generating, for a predetermined time period, a first set of maneuvering data corresponding to the route (i.e. the first route), wherein the maneuvering data comprises playback cues based on a predicted thin-client location (i.e. the map-matched thin-client location). For instance, the maneuvering data generation module 201d of the navigation service 101 may be configured to generate the maneuvering data. As used herein, the predetermined time period may have a duration based on a predetermined time threshold from a time the first location was received by the navigation service 101. In some example embodiments, the predetermined time period may be a fixed duration (e.g. two minutes) from the time the first location was received. In some examples, the predetermined time period may be variable and may be determined based on various parameters, such as network connectivity, road density, memory availability and the like. In some other example embodiments, the predetermined time period may be determined by the time determination module 201c of the navigation service 101. In some embodiments, the navigation service 101 (i.e. the time determination module 201c) may take two constraints into consideration for determining the time threshold. The two constraints may be thin-client location constraints and thin-client constraints. Examples of the thin-client location constraints may comprise signal strength associated with the route of the predicted thin-client location (for instance, the first route), traffic conditions associated with the route of the predicted thin-client location, geographical terrains associated with the route of the predicted thin-client location, road density associated with the route and the like. Examples of the thin-client constraints may comprise a network connectivity status of the thin-client 103, a subscription type of the thin-client 103, memory capacity of the thin-client 103, capability of the thin-client 103 to connect high speed network (e.g. 4G or 5G), and the like. To that end, the time determination module 201c may determine the time period (i.e. the predetermined time period) based on one or more of the network connectivity status of the thin-client 103, the traffic conditions associated with the route of the predicted thin-client location, the geographic terrain associated with the route of the predicted thin-client location, the subscription type of the thin-client 103, or the memory capacity of the thin-client 103.

In some example embodiments, the navigation service 101 may generate an empty set "CURRENT" for the predicted thin-client location (for instance, the first location). The navigation service 101 may compute, for the predetermined time period, all upcoming maneuvers on the calculated first route from the predicted thin-client location. In other words, the navigation service 101 may compute all maneuvers on the first route from the predicted thin-client location for e.g. the next two minutes from a current time. In some example embodiments, the navigation service 101 may learn to compute the upcoming maneuvers on the first route based on historic data of maneuvers on the first route. In some other embodiments, the navigation service 101 may learn to compute the upcoming maneuvers on the first route based on a success rate of maneuvers on the first route. The success rate may be learnt from the historic data of maneuvers on the first route. In some embodiments, the success rate may be based on traffic conditions on the first route. The traffic conditions may be learnt using crowdsourcing technique, historical data analysis, building a machine learning model and the like.

The navigation service 101 may generate a playback cue and a playable media file for each computed maneuver. For instance, the navigation service 101 may generate the playback cue and a playable media file for each of the computed upcoming maneuvers. The playback cue for a maneuver may comprise a timestamp based on the predicted thin-client location, and a maneuver ID (Identifier). The playable media file for the maneuver may comprise at least one maneuver instruction describing the maneuver. In various embodiments, the playback cue for the maneuver may be instructions/guides for outputting the corresponding playable media file. To that end, the navigation service 101 may synthetize the playable media file to perform the maneuver at the timestamp. In other words, the navigation service 101 may predict a time instance to perform the maneuver. In some example embodiments, the timestamp may be a time instance to play the corresponding playable media file for the maneuver. The navigation service 101 may synthetize the playable media file based on the route (for instance, the first route), the current time and a location of the maneuver on the route. For instance, the timestamp may be generated by summing up the current time and a traffic-based travel time on the first route from the first location up to the maneuver's location. Further, the playable media file for the generated timestamp may be synthesized. In some example embodiments, the timestamp may be an estimated time, at which the thin-client 103 may be few meters away from the maneuver.

The navigation service 101 may synthetize the maneuver ID for the maneuver. In some embodiments, the navigation service 101 may calculate, using a hashing algorithm such as MD5, SHA, RIPEMD, bcrypt, Whirlpool or the like, the maneuver ID for the maneuver based on the timestamp and the playable media file corresponding to the maneuver. In some example embodiments, the navigation service 101 may hash the timestamp and the playable media file into a sixty-four bit integer to generate the maneuver ID.

The navigation service 101 may synthetize the playable media file for the maneuver. In some example embodiments, the playable media may assist the user of the thin-client 103 in performing the maneuver. For instance, the playable media file may assist the user or the vehicle in taking a right-turn, a left-turn, a U-turn and the like. The playable media file may comprise at least one maneuver instruction describing the maneuver. The playable media file may comprise the maneuver instruction in an audio format, a video format or a combination thereof. In some embodiments, the navigation service 101 may retrieve data (i.e. the maneuver instruction) for synthetizing the playable media file. The navigation service 101 may retrieve the maneuver instruction, based on the subscription type of the thin-client 103, from one or more of a two-dimensional (2D) road model dataset, a three-dimensional (3D) road model dataset, a street name dataset, a POI (Point of Interest) dataset, a landmark dataset, a two dimensional (2D) building model dataset, or a three-dimensional (3D) building model dataset. In some example embodiments, the maneuver instruction retrieved from the 2D or 3D road model datasets may be simple arrows on the 2D or 3D maps respectively for the video format and may be voice commands such as "take a right-turn in 10 meters" for the audio format. In some example embodiments, the maneuver instruction retrieved from the street name dataset may be arrows with street names mentioned on the 2D or 3D maps for the video format and may be voice commands such as "take a right-turn in 10 meters at Johnson Street" for the audio format. In some example embodiments, the maneuver instruction retrieved from the POI or Landmark dataset may be arrows with POI/Landmarks mentioned on the 2D or 3D maps for the video format and may be voice commands such as "take a right-turn in 10 meters at Post Office" for the audio format. In some example embodiments, the maneuver instruction retrieved from the 2D or 3D building model dataset may be a video rendering the maneuver instruction with buildings on the 2D or 3D maps respectively. In some embodiments, the 3D models (i.e. the 3D road model dataset and the 3D building model dataset) may include a photorealistic 3D model for rendering the maneuver instruction. The 3D models rendering of the maneuver instructions may be, for example, for a premium type subscription category of the thin-client 103.

In some embodiments, the navigation service 101 may select a playable media file quality for synthetizing the playable media file. The navigation service 101 may select the playable media file quality based on the subscription type of the thin-client 103, the configuration of the thin-client 103, an available communication bandwidth of the thin-client 103, or a combination thereof. In some example embodiments, the selection of the playable media file quality involves selection of quality schemes for the audio and video formats. The quality schemes for the audio format may include mono, stereo, high bit-rate, sampling rate scheme and the like. The quality schemes for the video format may include color depth, video size, resolution scheme (Video Graphics Array (VGA), Standard Definition (SD), High Definition (HD), 4K video resolution) and the like. The audio format may further involve compression schemes such as ALAC, MP3, FLAC, AAC, MPEG-4, Vorbis, SBC or other lossy or lossless compression schemes. The audio format may further involve compression schemes such as MPEG, H.261, H.264, H.265, HVEC or other lossy or lossless compression schemes.

In this way, the navigation service 101 may synthetize the timestamp, the maneuver ID, and the playable media file for each computed maneuver. To that end, the navigation service may generate the playback cue and the playable media file for each computed maneuver. In some embodiments, the navigation service 101 may add the generated playback cue and the generated playable media file for each computed maneuver to the set "CURRENT". Additionally, in some embodiments, the navigation service 101 may compute a set "NEW" and a set "DEL". The navigation service 101 may subtract the set "SENT" from the set "CURRENT" to compute the set "NEW" (i.e. the set "NEW"=the set "CURRENT"-the set "SENT"). Currently, the set "NEW" may be the set "CURRENT", as the set "SENT" corresponds to the empty set. The navigation service 101 may subtract the set "CURRENT" from the set "SENT" to compute the set "DEL" (i.e. the set "DEL"=the set "SENT"-the set "CURRENT"). Currently, the set "DEL" may be an empty set, as the set "SENT" corresponds to the empty set. To that end, the set "CURRENT" or the set "NEW" may be the first set of maneuvering data for the predetermined time period. In some example embodiments, the navigation service 101 may perform the computations between the "SENT", "CURRENT" and "DEL" sets by comparing the maneuver IDs contained in the aforementioned sets.

At step 407, the method 400*a* may include transmitting the first set of maneuvering data to the thin-client 103. For instance, the navigation service 101 may transmit each element (i.e. the playback cue and the corresponding playable media file) of the set "CURRENT" or the set "NEW" to the thin-client 103. Further, in some embodiments, the navigation service 101 may update the set "SENT" with the set "CURRENT" for each transmitted element. For instance, the navigation service 101 may add each transmitted element to the set "SENT". At the thin-client 103, the thin-client 103 may generate the playback schedule for playback of the playback cues to provide the navigation instruction.

At step 409, the method 400*a* may include receiving, from the thin-client 103, a new thin-client location (for instance, a second location). In some embodiments, the navigation service 101 may receive the location of the thin-client 103 constantly with a predefined frequency until the destination location is reached. For instance, the navigation service 101 may receive the location of the thin-client 103 for every five second until the destination location is reached. To that end, the navigation service 101 may determine whether the thin-client 103 as deviated from the previously calculated route (for instance, the first route) and to provide the navigation instructions until the thin-client 103 reaches the destination location. As used herein, the first location and the second location may correspond to the thin-client location of the thin-client 103 received at two different instances of time. Further, the first location may be received prior in-time to the second location.

At step 411, the method 400*a* may include generating, for a subsequent predetermined time period, a second set of maneuvering data, wherein the maneuvering data comprises playback cues based on a further predicted user apparatus location. For instance, the maneuvering data generation module 201*d* of the navigation service 101 may be configured to generate the second set of maneuvering data. As used herein, the subsequent predetermined time period may be a time period of a duration based on a predetermined time threshold from a time the second location was received by the navigation service 101. In other words, the subsequent predetermined time period may be a duration (e.g. two minutes) with a start time of the duration being the time the second location was received. In some embodiments, the subsequent predetermined time period may be determined by the time determination module 201*c* as explained in step 405. Further, the navigation service 101 for generating the second set of maneuvering data is explained in the detail description of FIG. 4B.

FIG. 4B illustrates a flowchart depicting a method 400*b* executed by the navigation service 101 for generating the second set of maneuvering data, in accordance with one or more example embodiments. Starting at step 411*a*, the method 400*b* may include map-matching the second location. For instance, the map-matching module 201*a* of the navigation service 101 may be configured to map-match the second location. In some embodiments, the navigation service 101 may map-match the second location to identify a corresponding road network map location of the thin client.

At step 411*b*, the method 400*b* may include determining whether the map-matched second location is same as the destination location. In response to determining the map-matched location is same as the destination location, the method 400*b* may proceed with step 411*c*.

At step 411*c*, the method 400*b* may include terminating the generation of the maneuvering data. For instance, the navigation service 101 may stop generating the maneuvering data, as the thin-client 103 reached the destination location. In response to determining the map-matched location is not same as the destination location, the method 400*b* may proceed with step 411*d*.

At step 411d, the method 400b may include determining whether the map-matched second location correspond to the first route. For instance, the navigation service 101 may determine whether the thin-client 103 is located on the first route or deviated from the first route. In response to determining the map-matched second location corresponds to the first route, the method 400b may proceed with 411e.

At step 411e, the method 400b may include generating, for the subsequent predetermined time period, a second set of maneuvering data corresponding to the first route. According to some embodiments, the navigation service 101 may generate, for the subsequent predetermined time period, the second set of maneuvering data corresponding to the first route as explained in the detailed description of the step 405 of the FIG. 4A. For instance, the navigation service 101 may generate an empty set "CURRENT" for the second location; the navigation service 101 may compute all upcoming maneuvers for the subsequent predetermined time period on the first route from the second location of the thin-client 103; the navigation service 101 may generate a playback cue and a playable media file for each computed maneuver; and the navigation service 101 may add the generated playback cue and the generated playable media file for each computed maneuver to the set "CURRENT" to generate, for the subsequent predetermined time period, the second set of maneuvering data corresponding to the first route. In response to determining the map-matched second location not corresponds to the first route, the method 400b may proceed with step 411f.

At step 411f, the method 400b may include calculating a new route (for instance, a second route) based on the second location and the destination location. For instance, the route calculating module 201b of the navigation service may be configured to calculate a new route from the second location to the destination. In some embodiments, the navigation service 101 may calculate the new route from the map-matched second location to the destination location.

At step 411g, the method 400b may include replacing the first route with the second route. In some embodiments, the navigation service 101 may replace the previously calculated route (for instance, the first route) with the currently calculated route (for instance, the second route).

At step 411h, the method 400b may include transmitting an indication to the thin-client 103 to clear a playback schedule. In some example embodiments, when the thin-client 103 deviates from the previously calculated route, the navigation service 101 may transmit an indication (for instance, a clear message) to clear the scheduled playback of the playback cues. In some embodiments, the navigation service 101 may clear the set "SENT", when the thin-client 103 deviates from the previously calculated route (for instance, the first route).

At step 411i, the method 400b may include generating, for the subsequent predetermined time period, the second set of maneuvering data corresponding to the second route. According to some embodiments, the navigation service 101 may generate, for the subsequent predetermined time period, the second set of maneuvering data corresponding to the second route as explained in the detail description of the step 405 of the FIG. 4A, by replacing the previously calculated route with the currently calculated route. For instance, the navigation service 101 may generate an empty set "CURRENT" for the second location; the navigation service 101 may compute all upcoming maneuvers for the subsequent predetermined time period on the second route from the second location of the thin-client 103; the navigation service 101 may generate a playback cue and a playable media file for each computed maneuver; and the navigation service 101 may add the generated playback cue and the generated playable media file for each computed maneuver to the set "CURRENT" to generate, for the subsequent predetermined time period, the second set of maneuvering data corresponding to the second route.

As should be understood, once the second set of maneuvering data is generated at the step 411e or at the step 411i, the method 400a may be continued with step 413.

At step 413, the method 400a may include calculating an update set of maneuvering data based on the first set of maneuvering data and the second set of maneuvering data. In some embodiments, the navigation service 101 may calculate a set "NEW". The navigation service 101 may subtract the set "SENT" from the set "CURRENT" to calculate the set "NEW" (i.e. the set "NEW"=the set "CURRENT"–the set "SENT"). For instance, the navigation service 101 may remove the playback cues and the playable media files corresponding to the transmitted first set of maneuvering data from the second set of maneuvering data. To that end, the set "NEW" may store new playback cues and new playable media files corresponding to the new maneuvers of the second set of maneuvering data. In some example embodiments, the navigation service 101 may subtract the set "SENT" from the set "CURRENT" based on comparing the maneuver IDs of the set "SENT" and the maneuver IDs of the set "CURRENT". In some embodiments, the set "NEW" may be the update set of maneuvering data. According to some embodiments, the navigation service 101 may save bandwidth of transmission between the navigation service 101 and the thin-client 103 by calculating the updated set of maneuvering data. For instance, the navigation service 101 may remove the playback cues and the playable media files corresponding to the transmitted first set of maneuvering data from the second set of maneuvering data to transmit only the new playback cues and new playable media files corresponding to the new maneuvers of the second set of maneuvering data. Further, at step 413, the method 400a may include calculating a delete set of maneuvering data based on the first set of maneuvering data and the second set of maneuvering data. In some embodiments, the navigation service 101 may calculate a set "DEL". The navigation service 101 may subtract the set "CURRENT" from the set "SENT" to calculate the set "DEL" (i.e. the set "DEL"=the set "SENT"–the set "CURRENT"). For instance, the navigation service 101 may remove the playback cues and the playable media files corresponding to the second set of maneuvering data from the transmitted first set of maneuvering data. To that end, the set "DEL" may store old playback cues and old playable media files corresponding to the transmitted first set of maneuvering data. In some embodiments, the set "DEL" may be the delete set of maneuvering data. In some example embodiments, the navigation service 101 may subtract the set "CURRENT" from the set "SENT" based on comparing the maneuver IDs of the set "CURRENT" and the maneuver IDs of the set "SENT". In some example embodiments, the first set of maneuvering data and the second set of maneuvering data may be the same, when the first location and the second location of the thin-client 103 are same. In such a case, the set "NEW" and the set "DEL" may be the empty sets indicating that the thin-client 103 is still at one location.

At step 415, the method 400a may include transmitting the update set of maneuvering data to the thin-client 103 for providing the navigation instruction. In some embodiments, the navigation service 101 may transmit each element (i.e. the playback cue and the corresponding playable media file)

of the set "NEW" to the thin-client 103 for providing the navigation instruction. At the thin-client 103, the playback cues corresponding to the set "NEW" may be scheduled to provide the navigation instruction. Further, at step 415, the method 400*a* may include transmitting the delete set of maneuvering data to the thin-client 103. In some example embodiments, the navigation service 101, for each element (i.e. the playback cue and its corresponding playable media file) in the delete set of maneuvering data, may transmit only the maneuver ID corresponding to the element. For instance, the navigation service 101, for an element (e.g. (maneuver ID, timestamp, playable media file)) corresponding to the set "DEL", may transmit the playback cue as an instruction message (e.g. (maneuver ID, timestamp=empty, playable media file=empty)) to the thin-client 103 for deleting the scheduled playback cue of the maneuver.

As should be understood, the method 400*a* may be iteratively repeated for each newly received thin-client location. For instance, when the navigation service 101 receives an another new thin-client location (for instance, a third location), the navigation service 101 may resume with the step 409 of the method 400*a*, where the steps 401-407 correspond to the previously received location (i.e. the second location) and the steps 409-415 correspond to the currently received location (i.e. the third location). Accordingly, the first location and the second location are used here only for the explanation purposes. Indeed, the navigation service 101 generates the maneuvering data for each received thin-client location until the thin-client location corresponds to the destination location. To that end, the navigation service 101 may ensure the thin-client 103 is provided with the maneuvering data for a predetermined time period for each newly received thin-client location. Accordingly, even if a connection between the navigation service 101 and the thin-client 103 experiences high latency or is lost, the navigation instructions can still be provided from, e.g. a thin client 103 memory buffer, on-time. Further, the thin-client 103 for providing the navigation instruction based on the maneuvering data is explained in detail description of FIG. 5A-5B.

FIG. 5A illustrates a flowchart depicting a method 500*a* executed by the thin-client 103 for providing the navigation instructions, in accordance with one or more example embodiments. Starting at step 501, the method 500*a* may include transmitting, to the navigation service 101, the first location of the thin-client 103 and the destination location. In some embodiments, the thin-client 103 may be configured to transmit the thin-client location (for instance, the first location) to the navigation service 101. For instance, the thin-client 103 may determine a geographical position of the thin-client 103 using the GPS sensors of the thin-client 103 and transmit the determined geographical position as the thin-client location. Further, the thin-client 103 may be configured to transmit the destination location to the navigation service 101. In some embodiments, the thin-client 103 may transmit the destination location as audio data recorded at the thin client 103 (e.g. the voice message). For instance, when the user utters a phrase "Navigate to Airport", the thin-client 103 may be triggered to transmit the voice message as the destination location. In some other embodiments, the destination location may be transmitted as the touch position on the display of thin client 103. For instance, when the user touches the video display of the thin-client 103 to select a phrase "Navigate to Airport", the thin-client 103 may be triggered to transmit the touch position as the destination location.

At step 503, the method 500*a* may include receiving, from the navigation service 101, the first set of maneuvering data. In some embodiments, the received first set of maneuvering data may comprise one or more playback cues for the predetermined time period and one or more corresponding playable media files. For instance, the received first set of maneuvering data may comprise the one or more playback cues and the one or more corresponding playable media files for one or more upcoming maneuvers from the first location for e.g. the next two minutes. The playback cue may comprise the timestamp and the maneuver ID. In some embodiments, the timestamp may be a time instance to play the corresponding playable media file. In some embodiments, the maneuver ID may be an identity for the upcoming maneuver. In some example embodiments, the maneuver ID may be a hash value (for instance, a sixty four bit) of the corresponding timestamp and playable media file. In some embodiments, the playable media file may comprise at least one maneuver instruction describing the upcoming maneuver. In some embodiments, the playable media file may comprise the maneuver instruction in the audio format, the video format, or a combination thereof, based on the destination location or the subscription type of the thin-client 103. In some embodiments, the maneuver instruction may include additional information about the maneuver, for instance, the street name, the landmark and the like based on the service type subscription of the thin-client 103. Further, in some embodiments, the thin-client 103 may be configured to generate a playback schedule for the playable media files based on the maneuver IDs and the timestamps corresponding to the playable media files. For instance, the thin-client 103 may schedule the playable media file using the maneuver ID corresponding to the playable media file and the time information in the timestamp corresponding to the playable media file. Furthermore, the thin-client 103 may cause the playback of the generated playback scheduled on the thin-client 103 for providing the navigation instructions to perform the upcoming maneuvers.

At step 505, the method 500*a* may include transmitting, to the navigation service 101, the second location of the thin-client 103. In some embodiments, the thin-client 103 may be configured to transmit a new thin-client (for instance, the second location) to the navigation service 101. In some embodiments, the thin-client 103 may transmit the thin-client location constantly with a predefined frequency. For instance, the thin-client 103 may transmit the new thin-client location for every five seconds.

At step 507, the method 500*a* may include receiving, from the navigation service 101, the update set of maneuvering data in response to transmitting the second location. The received update set of maneuvering data may comprise one or more updated playback cues for one or more upcoming maneuvers and corresponding playable media files. The playback cues may comprise the updated timestamp and the updated maneuver ID. Further, at step 507, the method 500*a* may include receiving, from the navigation service 101, the delete set of maneuvering data in response to transmitting the second location. The received delete set of maneuvering data may comprise one or more playback cues in the form of one or more instruction messages (e.g. (maneuver ID, timestamp=empty, playable media file=empty)). Furthermore, at step 507, the method 500*a* may include receiving, from the navigation service 101, an indication (for instance, a clear message) to remove at least one maneuver. In some embodiments, the thin-client 103 may receive, from the navigation service 101, the indication to clear at least one maneuver. In response to receiving the indication to clear the maneuver, the thin-client 103 may clear the scheduled playable media file corresponding to the maneuver. In some example embodiments, the thin-client 103 may receive an indication to completely clear the playback schedule. To that end, the thin-client 103 may completely clear the playback schedule.

At step 509, the method 500*a* may include generating a playback schedule based on the first set of maneuvering data and the update set of maneuvering data. In some embodiments, the thin-client may generate the playback schedule based on the first set of maneuvering data, the update set of maneuvering and the delete set of maneuvering data. Further, the thin-client 103 for generating the playback schedule is explained in the detail description of FIG. 5B.

FIG. 5B illustrates a flowchart depicting a method 500*b* executed by the thin-client 103 for generating the playback schedule, in accordance with one or more example embodiments. Starting at step 509*a*, the method 500*b* may include determining if the maneuver ID of the playback cue is present on the playback schedule. For instance, the thin-client 103 may determine, for each received playback cue corresponding to the second location, if the maneuver ID of each received playback cue is present on the playback schedule generated for the first set of maneuvering data. In response to determining the maneuver ID of the playback cue is present on the playback schedule, the method 500*b* may proceed with the step 509*b*.

At step 509*b*, the method 500*b* may include overwriting the playback cue with a more recently received playback cue matching the maneuver ID. For instance, when the maneuver ID of the recently received playback cue is present on the playback schedule generated for the first set of maneuvering data, the thin-client 103 may overwrite the playable media file with the recently received playable media file matching the maneuver ID. In some embodiments, an empty playable media file and/or an empty timestamp may indicate a deleted old playable media file. In response to determining the maneuver ID of the playback cue is not present on the playback schedule, the method 500*b* may proceed with the step 509*c*.

At step 509*c*, the method 500*b* may include adding the playback cue to the playback schedule. In some embodiments, when the maneuver ID of the recently received playback cue is not present on the playback schedule generated for the first set of maneuvering data, the thin-client 103 may add the playback cue to the playback schedule generated for the first set of maneuvering data. For instance, the thin-client 103 may schedule the playable media file corresponding to the recently received playback cue using the maneuver ID of the playback cue and the timestamp of the playback cue.

As should be understood, once the playback schedule is generated for the recently received playback cues, the method 500*a* may continue with the step 511.

At step 511, the method 511 may include causing the playback on the thin-client 103 of at least one playable media file according to the generated playback schedule to provide the navigation instructions. For instance, the thin-client 103 may play the playable media files according to the timestamps corresponding to the playable media files to provide the navigation instructions. In some embodiments, the thin-client 103 may cause the playback of the playable media file via the speaker of the thin-client 103, the video display of thin-client 103, or a combination thereof.

In this way, the thin-client 103 may be configured to receive, for each transmitted thin-client location, the maneuvering data for the predetermined time period and generate the playback schedule for the received maneuvering data to provide the navigation instructions. Accordingly, the thin-client 103 may provide the accurate navigation instructions, even if the connection between the thin-client 103 and the navigation service 101 correspond to the low latency connection or lost, during the predetermined time period computed by the navigation service 101. Indeed, the navigation service 101 may determine the time period by considering the location constraints. To that end, the thin-client 103 may provide the accurate navigation instruction until the destination is reached without any hassle. Further, the steps executed by the thin-client 103 may be implemented on the simpler hardware with low power requirements, e.g. on hardware with processing capabilities similar to a media player. Further, the navigation service flowcharts (e.g. 400*a* and 400*b*) and the thin-client flowcharts (e.g. 500*a* and 500*b*) implementation on the navigation service 101 and the thin-client 103 respectively may be evident from FIGS. 6-8.

FIG. 6A illustrates a schematic diagram 600*a* of a thin-client 601 for providing voice-based navigation instructions, in accordance with one or more example embodiments. The thin-client 601 may be a voice-based navigation device. The thin-client 601 may comprise a microphone 603 and a speaker 605 in addition to the CPU, the GNSS sensor, the communication interface. The microphone 603 and the speaker 605 may include microphones and speakers that are known in the art. The microphone 603 receives the input from a user (e.g. a driver, a pedestrian, a traveler, and the like) of the thin-client 601. For instance, when the user utters a phrase "Navigate to XYZ" (where, XYZ may be the destination location), the microphone 603 receives the sound of the user's voice, which is recorded as an audio file corresponding to the destination location. The audio file may then be transmitted to the navigation service 101 for processing as described before. The process may be performed analogously for other navigation functions, such as POI search, navigation stop/pause, adding/removing waypoints on a route or the like the like.

The speaker 605 may output the maneuver instructions as the navigation instructions. For instance, when the thin-client 601 is few meters away from the maneuver location, the speaker 605 may output the maneuver instruction (e.g. "take a right-turn in 10 meter" and the like) corresponding to the maneuver location. To that end, the maneuver instruction may be generated based on playback cues received by the thin client 601 from the navigation service 101. The thin-client 601 may be an embodiment of the thin-client 103 for providing voice-based navigation instructions. Further, the embodiment for providing the voice-based navigation instructions is explained in the detail description of FIG. 6B.

FIG. 6B illustrates a schematic diagram 600*b* showing an example system architecture for providing the voice-based navigation instructions, in accordance with one or more example embodiments. The thin-client 601 may receive the uttered phrase from the user of the thin-client 601. The thin-client 601 may convert the uttered phrase to an audio file (e.g. a waveform) and transmit to the navigation service 101. Further, the thin-client 601 may determine the thin-client location using the GPS sensor and transmit the thin-client location. In some embodiments, the thin-client 601 may constantly transmit the thin-client location with the predefined frequency until the destination location is reached. In some example embodiments, the thin-client 601 may transmit speed data associated with the thin-client 601 and heading direction data associated with the thin-client 601 along with the thin-client location, when the thin-client 601 comprises the accelerometer sensor and the gyroscope sensor respectively.

Once the navigation service 101 receives the destination location and the thin-client location from the thin-client 601, the navigation service 101 may calculate a route from the thin-client location to the destination location and responds with a output voice message "OKAY" or "Navigating to XYZ". Further, the navigation service 101 executes the methods 400a and 400b as explained in the detail description of FIG. 4A and FIG. 4B respectively to generate and transmit the maneuvering data. To that end, the navigation service 101 may ensure that the thin-client 601 is provided with the maneuvering data (i.e. the maneuver instructions for all up-coming maneuvers on the route) for the predetermined time period for each received thin-client location. Further, the navigation service 101 may determine whether the thin-client 601 has deviated from the route. When the thin-client 601 deviates from the route, the navigation service 101 may send, to the thin-client 601, the clear message (i.e. the clear message to clear the scheduled maneuver instructions) and transmit the maneuvering data for a new route.

Once, the thin-client 601 receives the maneuvering data, in response to transmitting the thin-client location, the thin-client 601 may execute the methods 500a and 500b as explained in the detail description of FIG. 5A and FIG. 5B respectively for providing the navigation instructions. For instance, the scheduled playable media file (i.e. the scheduled maneuver instruction) may be provided as the navigation instructions. The received maneuvering data may be as explained in detail description of FIG. 6C.

FIG. 6C illustrates an exemplary maneuvering data 607 for providing the voice based navigation instructions, in accordance with one or more example embodiments. The maneuvering data 607 may comprise a maneuver ID 607a, a timestamp 607b, and a playable audio file 607c. The maneuver ID 607a may be determined by using the hash function on the timestamp 607b and the playable audio file 607c. In some example embodiments, the maneuver ID 607a may be a sixty-four bit integer. The timestamp 607b may indicate a time instance to play the playable audio file 607c. The playable audio file 607c may comprise at least one audio maneuver instruction describing the maneuver.

FIG. 7A illustrates a schematic diagram 700a of a thin-client 701 for providing video-based navigation instructions, in accordance with one or more example embodiments. The thin-client 701 may be a video-based navigation device. The thin-client 701 may comprise a video display 703 in addition to the CPU, the GNSS sensor, and the communication interface. The video display 703 may be equipped with touch input sensors to sense a touch position of the user on the video display 703. Once, the touch sensors senses a touch from the user, the video display 703 displays a search bar 703a with a virtual keyboard. In some example embodiments, the search bar 703a may be a still video provided by the navigation service 101 that shows a phrase "Where do you want to navigate to?" with the virtual keyboard. When the user clicks the virtual keyboard, the thin-client 701 may transmit the touch position(s) to the navigation service 101. The navigation service 101 may determine a location based on the touch position and transmit a still video (or image file) with a search result corresponding to the location. In this way, the navigation service 101 may continuously transmit still videos (or image files) with the search result until the user selects the search result to indicate the destination location. Once, the search result is selected by the user, the thin-client 701 may transmit the selected search result (i.e. the touch position) as the destination location to the navigation service 101. The process may be performed analogously for other navigation functions, such as POI search, navigation stop/pause, adding/removing waypoints on a route or the like the like.

Further, the video display 703 may display the maneuver instructions as the navigation instructions (for instance, a video 703b). The video 703b may comprise an animation of the map from the current location of the thin-client 701 (or from a previous maneuver's location) to the upcoming maneuver's location, an animation of the maneuver instruction on the map, a maneuver instruction text, a combination thereof, or the like. The thin-client 701 may be an embodiment of the thin-client 103 for providing the video-based navigation instructions and the animated maps may form a part of playable media files received as maneuvering data from the navigation service 101. Further, the embodiment for providing the video-based navigation instructions is explained in the detail description of FIG. 7B.

FIG. 7B illustrates a schematic diagram 700b showing an example system architecture for providing the video-based navigation instructions. The thin-client 701 may transmit the touch position (i.e. the selected search result) to the navigation service 101. Further, the thin-client 701 may determine the thin-client location using the GNSS sensor of the thin-client 701 and transmit the thin-client location. In some embodiments, the thin-client 701 may constantly transmit the thin-client location with the predefined frequency until the destination location is reached. In some example embodiments, the thin-client 701 may transmit the speed data associated with the thin-client 701 and the heading direction data associated with the thin-client 701 along with the thin-client location, when the thin-client 701 comprises the accelerometer sensor and the gyroscope sensor respectively.

Once, the navigation service 101 receives the destination location and the thin-client location from the thin-client 701, the navigation service 101 may compute a route from the thin-client location to the destination location and responds with a output video message "OKAY" or "Navigating to XYZ". Further, the navigation service 101 executes the methods 400a and 400b as explained in the detail description of FIG. 4A and FIG. 4B respectively to generate and transmit the maneuvering data. To that end, the navigation service 101 may ensure that the thin-client 701 is provided with the maneuvering data (i.e. the maneuver instructions for all up-coming maneuvers on the route) for the predetermined time period for each received thin-client location. Further, the navigation service 101 may determine whether the thin-client 701 as deviated from the route. When the thin-client 701 deviates from the route, the navigation service 101 may send, to the thin-client 701, the clear message (i.e. the clear message to clear the scheduled maneuver instructions) and transmit the maneuvering data for a new route.

Once, the thin-client 701 receives the maneuvering data, in response to transmitting the thin-client location, the thin-client 701 may execute the methods 500a and 500b as explained in the detail description of FIG. 5A and FIG. 5B respectively for providing the navigation instructions. For instance, the scheduled playable media files may be provided as the navigation instructions (i.e. the video 703b). The received maneuvering data may be as explained in detail description of FIG. 7C.

FIG. 7C illustrates an exemplary maneuvering data 705 for providing the video-based navigation instructions, in accordance with one or more example embodiments. The maneuvering data 705 may comprise a maneuver ID 705a timestamp 705b, and a playable video file 705c. The maneuver ID 705a may be determined by using the hash function on the timestamp 705b and the playable video file 705c. In some example embodiments, the maneuver ID 705a may be a sixty-four bit integer. The timestamp 705b may indicate a time instance to play the playable video file 705c. The playable video file 705c may comprise at least one video maneuver instruction (i.e. the video 703b) describing the maneuver.

FIG. 8 illustrates an exemplary scenario 800 for providing the navigation instructions, in accordance with one or more example embodiments. As illustrated in FIG. 8, the scenario 800 may comprise the navigation service 101, such as a server, the thin-client 103, the mapping platform 105, the network 107, a vehicle 801, a destination location 803, a route 805 from the thin-client location to the destination location 803, a road tunnel 809 and a new route 807 from the thin-client location to the destination location 803. In various embodiments, the vehicle 801 may be equipped with the thin-client 103 for assisting the user to travel from one location to another location (for instance, the destination location 803). The thin-client 103 may transmit the thin-client location (i.e. the current location of the thin-client 103) and the destination location 803 to the navigation service 101. The navigation service 101 may calculate the route 805 from the thin-client location to the destination location 803. However, there may be alternate routes to reach the destination location 803, such as the route 807.

To that end, the navigation service 101 may constantly receive the thin-client location to determine whether the thin-client 103 deviates from the route 805. When the thin-client 103 deviates from the route 805, the navigation service 101 may calculate the new route 807 to provide the accurate navigation instructions. According to some embodiments, the connection between the thin-client 103 and the navigation service 101 may be lost or may become a high latency connection, when the vehicle 801 is travelling along the route 805 or the route 807 to reach the destination location 803. One best example for the connection to be lost is the road tunnel 809 along the route 805 or 807. For instance, when the vehicle 801 is travelling in the road tunnel 807, the connection between the thin-client 103 and the navigation service 101 may be lost.

To that end, the navigation service 101 may generate the maneuvering data for the predetermined time period as explained in detail description of FIG. 4A-4B. The maneuvering data may comprise the playable media files and the playback cues for playing the playable media files. Indeed, the navigation service 101 may determine the time period for generating the maneuvering data by considering the location constraints. For instance, the navigation service 101 determines the time period for generating the maneuvering data by considering the road tunnel 807. The navigation service 101 may transmit the generated maneuvering data to the thin-client 103. The thin-client 103 may provide the navigation instructions as explained in detail description of FIG. 5A-5B. Therefore, the navigation instructions are accurately provided on time, even if the connection between the thin-client 103 and the navigation service 101 is lost or experiences high latencies. Further, the thin-client 103 used to provide the navigation instruction may be the simpler low powered hardware as the most of the processing intensive tasks are executed by the navigation service 101.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for providing navigation instructions by a navigation service, the method comprising:
receiving, from a user apparatus, a location and a destination location;
calculating a route from the location to the destination location;
generating a set of maneuvering data indicating an amount of maneuvers on the route for a predetermined time period, wherein the set of maneuvering data comprises, for each maneuver of the amount:
(i) a playable media file comprising at least one maneuver instruction describing said maneuver of the amount; and
(ii) a playback cue including a timestamp for playing the playable media file on the user apparatus, wherein the timestamp is generated based on a predicted traffic-based travel time on the route from a predicted user apparatus location to a location of said maneuver of the amount;
transmitting the set of maneuvering data to the user apparatus for providing the navigation instructions.

2. The method of claim 1, wherein the location is a first location, the route is a first route, the set of maneuvering data is a first set of maneuvering data, the amount is a first amount, the playable media file is a first playable media file, the playback cue is a first playback cue, and the timestamp is a first timestamp, the method of claim 1, further comprising:
receiving, from the user apparatus, a second location;
map-matching the second location;
responsive to the map-matched second location corresponding to the first route, generating a second set of maneuvering data to indicate a second amount of maneuvers on the first route for a subsequent predetermined time period;
responsive to the map-matched second location not corresponding to the first route:
calculating a second route based on the second location and the destination location; and
generating the second set of maneuvering data to indicate a third amount of maneuvers on the second route for the subsequent predetermined time period,
wherein the second set of maneuvering data comprise, for each maneuver of the second amount or the third amount:

(i) a second playable media file comprising at least one second maneuver instruction describing said maneuver of the second amount or the third amount; and (ii) a second playback cue including a second timestamp for playing the second playable media file on the user apparatus, wherein the second timestamp is generated based on a further predicted traffic-based travel time from a further predicted user apparatus location to a location of said maneuver of the second amount or the third amount;

and transmitting an indication to the user apparatus to clear a playback schedule;

calculating an update set of maneuvering data based on the first and second set of maneuvering data; and transmitting the update set of maneuvering data to the user apparatus for providing the navigation instructions.

3. The method of claim 2, further comprising:

calculating a delete set of maneuvering data based on the first and second set of maneuvering data; and, transmitting an instruction message to the user apparatus, said message identifying at least one maneuver to be deleted.

4. The method of claim 2, wherein each of the first and second playable media files comprises audio, video or a combination thereof.

5. The method of claim 2, wherein generating the first and second set of maneuvering data further comprises retrieving data, based on a subscription type of the user apparatus, from at least one of: a 2D or 3D road model dataset, a street name dataset, a POI dataset, a landmark dataset, and a 2D or 3D building model dataset.

6. The method of claim 2, wherein generating the first set and second set of maneuvering data further comprises selecting a playable media file quality based on a subscription type of the user apparatus, a configuration of the user apparatus, an available communication bandwidth of the user apparatus, or a combination thereof.

7. The method of claim 1, wherein the playback cue further comprises a maneuver ID, wherein the maneuver ID is a hash value of the playable media file and the timestamp.

8. The method of claim 2, wherein the predetermined time period is determined based on one or more of a network connectivity status of the user apparatus, traffic conditions in a region associated with a route of travel of the user apparatus, a geographical terrain associated with the route of travel of the user apparatus, a service type subscription of the user apparatus and configuration information of the user apparatus.

9. A method for providing navigation instructions by a user apparatus, the method comprising:

transmitting, to a navigation service, a location of the user apparatus and a destination location;

receiving, from the navigation service, a set of maneuvering data corresponding to a route generated based on the location and the destination location, the set of maneuvering data indicating an amount of maneuvers on the route for a predetermined time period, wherein the set of maneuvering data comprises, for each maneuver of the amount:

(i) a playable media file comprising at least one maneuver instruction describing said maneuver of the amount;

(ii) a playback cue including a timestamp for playing the playable media file on the user apparatus, wherein the timestamp is generated based on a predicted traffic-based travel time on the route from a predicted user apparatus location to a location of said maneuver of the amount; and (iii) a maneuver ID;

generating a playback schedule based on the playback cue of the set of maneuvering data; and causing playback on the user apparatus of at least one playable media file according to the playback schedule to provide the navigation instructions.

10. The method of claim 9, wherein generating the playback schedule further comprises:

determining if a maneuver ID of a playback cue is present on the playback schedule;

overwriting the playback cue with a more recently received playback cue matching the maneuver ID in response of the maneuver ID being present on the playback schedule; and adding the playback cue to the playback schedule in response of the maneuver ID not being present on the playback schedule.

11. The method of claim 9, further comprising:

removing the at least one maneuver from the playback schedule in response to receiving an indication to remove at least one maneuver.

12. An apparatus for providing navigation instructions, the apparatus comprising:

a communication interface;

one or more processors; and a non-transitory computer readable storage medium having computer program code instructions stored therein, the computer program code instructions, when executed by the one or more processors, cause the apparatus to:

receive, from a user apparatus, a location and a destination location;

calculate a route from the location to the destination location;

generate a set of maneuvering data indicating an amount of maneuvers on the route for a predetermined time period, wherein the set of maneuvering data comprises, for each maneuver of the amount:

(i) a playable media file comprising at least one maneuver instruction describing said maneuver of the amount; and (ii) a playback cue including a timestamp for playing the playable media file on the user apparatus, wherein the timestamp is generated based on a predicted traffic-based travel time on the route from a predicted user apparatus location to a location of said maneuver of the amount;

transmit the set of maneuvering data to the user apparatus for providing the navigation instructions.

13. The apparatus of claim 12, wherein the location is a first location, the route is a first route, the set of maneuvering data is a first set of maneuvering data, the amount is a first amount, the playable media file is a first playable media file, the playback cue is a first playback cue, and the timestamp is a first timestamp, and wherein the computer program code instructions, when executed by the one or more processors, further cause the apparatus to:

receive, from the user apparatus, a second location;

map-match the second location;

responsive to the map-matched second location corresponding to the first route, generate a second set of maneuvering data to indicate a second amount of maneuvers on the first route for a subsequent predetermined time period;

responsive to the map-matched second location not corresponding to the first route:

calculate a second route based on the second location and the destination location; and generate the second set of maneuvering data to indicate a third amount of maneuvers on the second route for the subsequent predetermined time period, wherein the second set of maneuvering data comprise, for each maneuver of the second amount or the third amount:

(i) a second playable media file comprising at least one second maneuver instruction describing said maneuver of the second amount or the third amount; and (ii) a second playback cue including a second timestamp for playing the second playable media file on the user apparatus, wherein the second timestamp is generated based on a further predicted traffic-based travel time from a further predicted user apparatus location to a location of said maneuver of the second amount or the third amount; and transmit an indication to the user apparatus to clear a playback schedule;

calculate an update set of maneuvering data based on the first and second set of maneuvering data; and transmit the update set of maneuvering data to the user apparatus for providing the navigation instructions.

14. The apparatus of claim 13, wherein the computer program code instructions, when executed by the one or more processors, further cause the apparatus to:

calculate a delete set of maneuvering data based on the first and second set of maneuvering data; and, transmit an instruction message to the user apparatus, said message identifying at least one maneuver to be deleted.

15. The apparatus of claim 13, wherein each of the first and second playable media files comprises audio, video or a combination thereof.

16. The apparatus of claim 13, wherein, to generate the first and second set of maneuvering data, the computer program code instructions, when executed by the one or more processors, further cause the apparatus to retrieve data, based on a subscription type of the user apparatus, from at least one of: a 2D or 3D road model dataset, a street name dataset, a POI/Landmark dataset, and a 2D or 3D building model dataset.

17. The apparatus of claim 13, wherein, to generate the first and second set of maneuvering data, the computer program code instructions, when executed by the one or more processors, further cause the apparatus to select a playable media file quality based on a subscription type of the user apparatus, a configuration of the user apparatus, an available communication bandwidth of the user apparatus, or a combination thereof.

18. The apparatus of claim 12, wherein the playback cue further comprises a maneuver ID, wherein the maneuver ID is a hash value of the playable media file and the timestamp.

19. The apparatus of claim 12, wherein the set of maneuver data causes the user apparatus to, for each instance in which a timestamp of a maneuver of the amount coincides with a period in which the apparatus cannot establish communication with the user apparatus, play a playable media file corresponding to the timestamp.

\* \* \* \* \*